United States Patent [19]
Kawano et al.

[11] Patent Number: 5,933,605
[45] Date of Patent: Aug. 3, 1999

[54] APPARATUS FOR FILTERING MULTICAST MESSAGES TRANSMITTED BETWEEN SUBNETWORKS BASED UPON THE MESSAGE CONTENT

[75] Inventors: Shigeki Kawano, Yokosuka; Katsumi Kawano, Kawasaki; Hiroshi Wataya, Hitachinaka; Tamio Iizuka, Hitachi, all of Japan

[73] Assignee: Hitachi, Ltd., Tokyo, Japan

[21] Appl. No.: 08/745,665

[22] Filed: Nov. 8, 1996

[30] Foreign Application Priority Data

Nov. 10, 1995 [JP] Japan .................................. 7-292826

[51] Int. Cl.$^6$ ............................. G06F 13/00; G06F 15/16
[52] U.S. Cl. ................................ 395/200.68; 395/200.79
[58] Field of Search ......................... 395/200.68, 200.79; 370/911, 401

[56] References Cited

U.S. PATENT DOCUMENTS

| | | | |
|---|---|---|---|
| 4,366,479 | 12/1982 | More et al. | 340/825.05 |
| 5,282,270 | 1/1994 | Oppenheimer et al. | 395/200.53 |
| 5,361,256 | 11/1994 | Doeringer et al. | 370/390 |
| 5,428,615 | 6/1995 | Backes et al. | 370/392 |
| 5,572,678 | 11/1996 | Homma et al. | 395/200.57 |
| 5,594,872 | 1/1997 | Kawano et al. | 395/200.75 |
| 5,608,726 | 3/1997 | Virgile | 370/401 |
| 5,644,571 | 7/1997 | Seaman | 370/401 |

OTHER PUBLICATIONS

Braudes, R., et al., "Requirements for Multicast Protocols," RFC 1458, Network Working Group, pp. 1–18, May 1993.
Deering, S., "Host Extensions for IP Multicasting," RFC 1112, Network Working Group, pp. 1–17, Aug. 1989.
D. E. Comer, et al., "Internetworking with TCP/IP, vol. 11: Design, Implenentation, and Internals", Prentice Hall, New Jersey, 1991, pp. 81–163.

*Primary Examiner*—Zarni Maung
*Assistant Examiner*—Andrew Caldwell
*Attorney, Agent, or Firm*—Antonelli, Terry, Stout & Kraus, LLP

[57] ABSTRACT

A network system includes at least one computer which includes a processor for processing data and attaching an associated contents code corresponding to the processed data and data group information indicative of a data group corresponding to the attributes of the processed data to ask a data transmission request and a transmission controller connected to the processor for controllably transmitting a frame including the transmission sub-network, the contents code and the processed data to the first sub-network according to the data group information of the processed data. A second computer connected judges whether or not the contents code of the frame received from the first sub-network conforms to one of a plurality of data reception enable/disable judgement conditions. A third computer judges whether or not the contents code of the frame received conforms to one of a plurality of data reception enable/disable judgement conditions, and storing the received frame having the contents code conforming to one of the plurality of data reception enable/disable judgement conditions. The second computer includes a filter in which the contents codes differently set for respective sub-networks are stored and which changes the contents code contained in the received frame to the contents code set for the receiving sub-network.

4 Claims, 22 Drawing Sheets

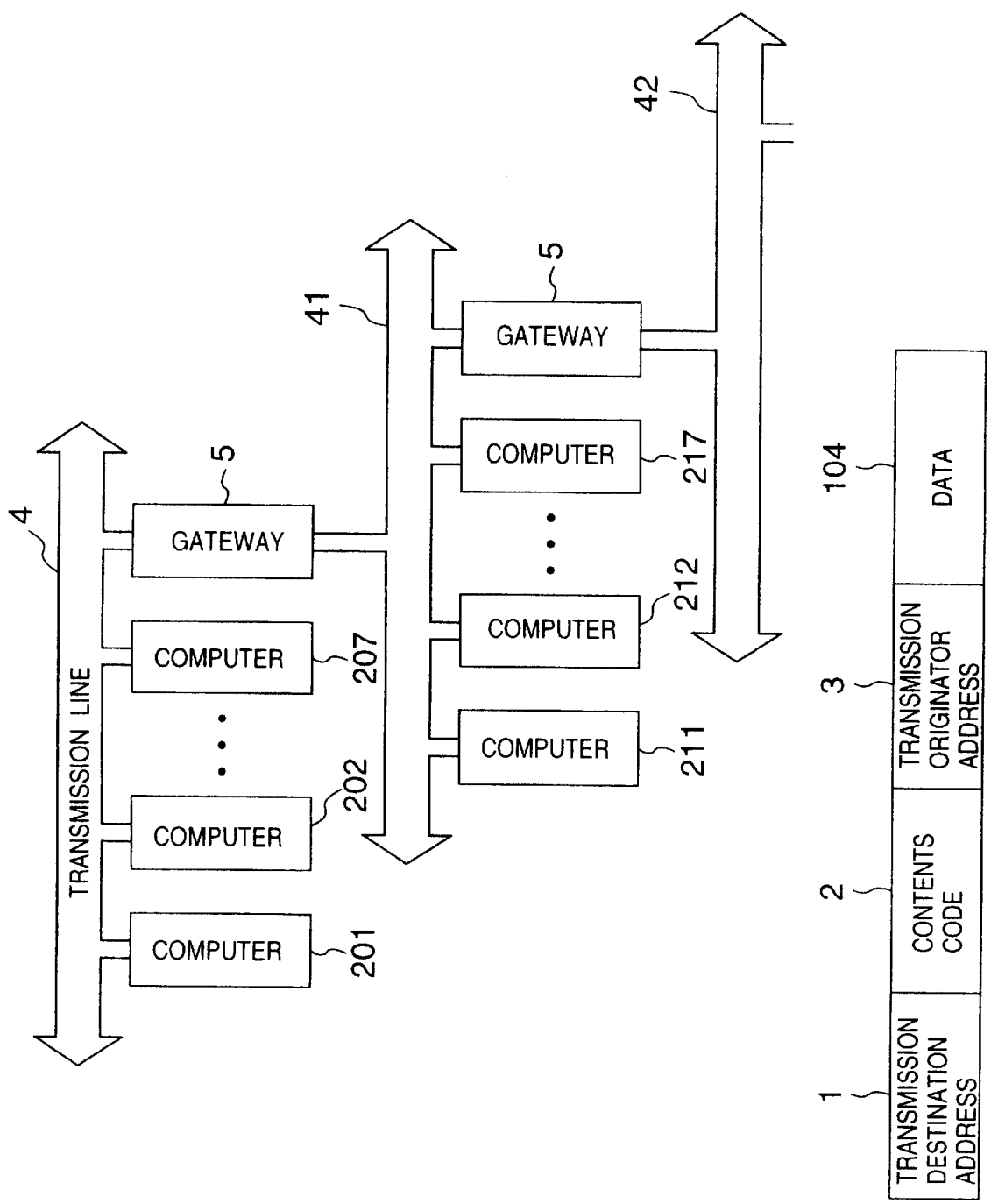

FIG.4

| TRANSMISSION DESTINATION ADDRESS (COMPUTER GROUP NAME) 1 | 8 SUB-NETWORK ADDRESS | 9 PORT ADDRESS |
|---|---|---|
| DF - 1 | Sub - A | P1 |
| DF - 2 | Sub - B<br>Sub - C | P2<br>P3 |
| DF - 3 | Sub - D | P4<br>P5 |
| ... | ... | ... |

6 COMPUTER GROUP TABLE

FIG.5

START

↓

RECEIVE DATA TRANSMISSION INSTRUCTION AT DATA TRANSMITTER — 602

↓

REFER TO COMPUTER GROUP TABLE TO ACQUIRE COMPUTER GROUP INFORMATION SPECIFIED IN DATA — 603

↓

SET SUB-NETWORK ADDRESS AND PORT ADDRESS CORRESPONDING TO COMPUTER GROUP IN TRANSMISSION MESSAGE — 604

↓

TRANSMIT MESSAGE TO TRANSMISSION LINE — 605

↓

END

| FILTER TABLE | | | |
|---|---|---|---|
| COMPUTER GROUP NAME | DF - 1 | DF - 2 |
| CONTENTS CODE | CC1 | CCP |

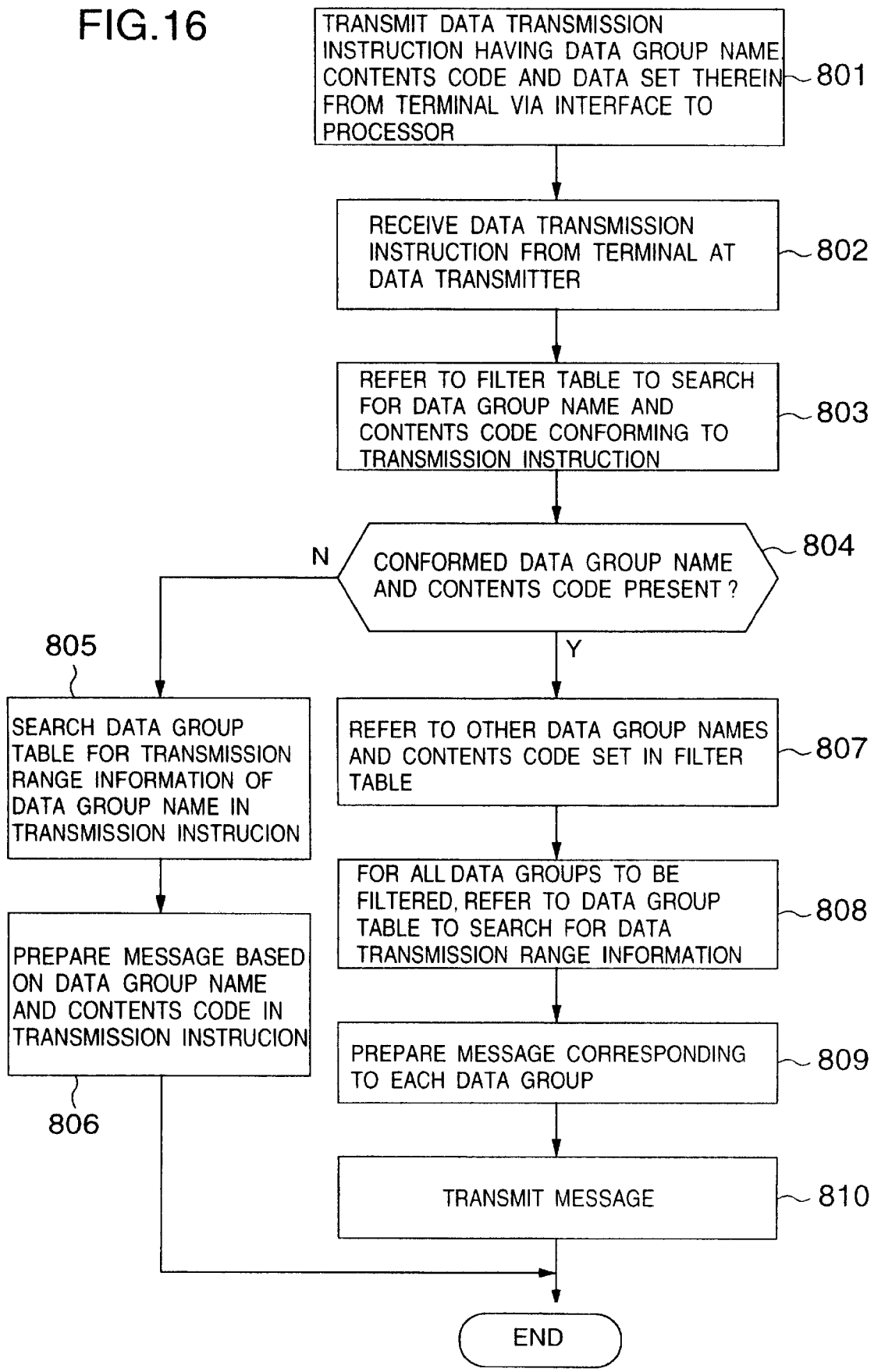

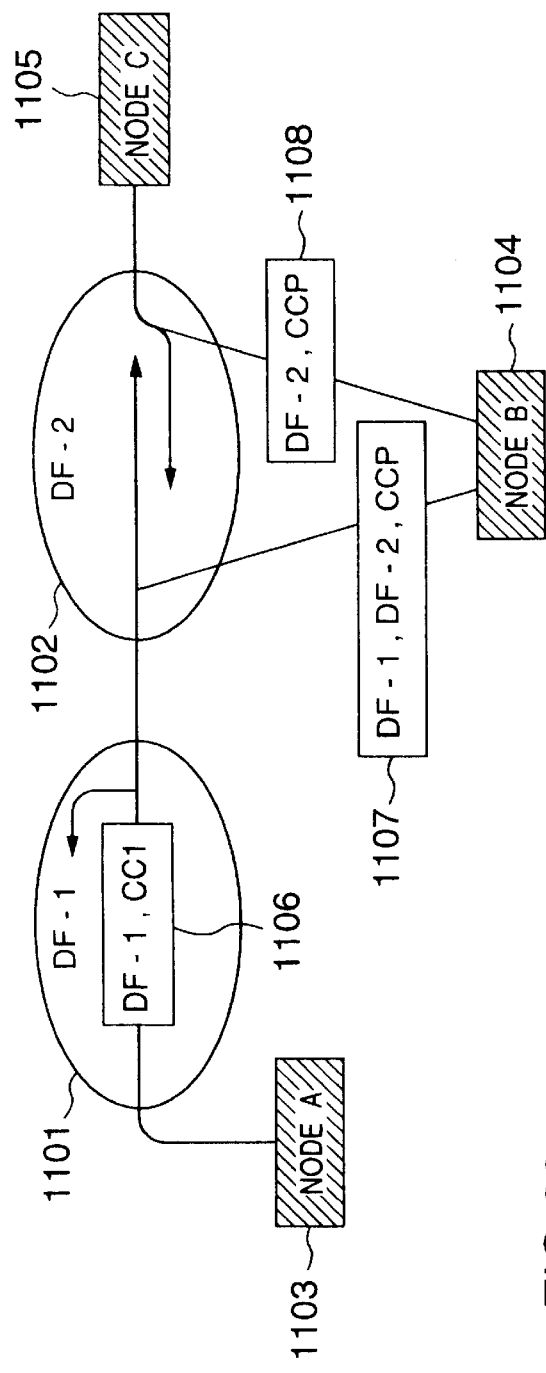

| 2001 | 2002 | 2003 | 3 | 2004 |
|---|---|---|---|---|
| GATEWAY SERIAL NUMBER | GATEWAY NUMBER | GATEWAY TOTAL NUMBER | CONTENTS CODE | DATA |

APPARATUS FOR FILTERING MULTICAST MESSAGES TRANSMITTED BETWEEN SUBNETWORKS BASED UPON THE MESSAGE CONTENT

BACKGROUND OF THE INVENTION

The present invention relates to methods for transmitting data in a system in which a single or a plurality of computer distributed systems are interconnected through a gateway via communication line, and more particularly, to a method for transmitting data by which, in order to improve the expansibility of a system, information filtering operation is carried out, that is, the amount of data to be transmitted onto a communication line is decreased to remarkably save a communication quantity and the receiving operation of unnecessary data is suppressed to selectively receive only necessary data to thereby improve the processing efficiencies and data receiving performances of respective computers at the time of transmitting contents code data.

Conventionally, when it is desired to carry out data communication from a single computer distributed system via a communication line, data has been attached with a destination address for one-to-one communication or with a group address for broadcast communication. In this case, the group address has been set to indicate a single common address for a group of computers. Equipment connected between transmission lines (e.g., LANs), for example, a router (a gate having a path selecting function) or a gateway (a gate having an address converting function) has a function of data to the transmission lines selected based on the destination address attached to the data or of executing a transmission suppression function.

These equipment have a function of extracting only part of information on a transmission line and sending it to another transmission line, so-called filtering function. Selection of information to be extracted between the transmission lines is executed on the basis of the destination computer address attached to the data.

Meanwhile, there has been widely employed a communication system using contents code, wherein a contents code indicative of the contents of data is attached to the data and a data receiver side judges reception or non-reception of the data on the basis of the contents code. With respect to the contents code, data within the system are classified into layered data depending on the types of the data, and a sub-contents code defining, e.g., a data group in addition to the contents code is attached thereto, so that the receiver side first judges reception or non-reception of the data on the basis of the sub-contents code, identifies the type of the computer in the group on the basis of the contents code, and then finally determines the reception or non-reception of the data.

With regard to the layered contents code, however, such a communication system has not been realized yet that uses the contents code having multiplexed sub-contents codes.

One of solutions to realizing flexible expansion of a system is to employ contents code communication. In this method, a message is broadcast to all computers and each receiver side judges reception or non-reception of the message. Thus, when this method is applied to a wide range of large-scale computer distributed system, the method has had a problem that the amount of message to be transmitted becomes enormous and communication load becomes high.

Techniques about the communication system using the group address, router, bridge, gateway and contents code are disclosed in D. E. Comer, et al, "Internetworking With TCP/IP—Vol 11: Design, Implementation, and Internals", PRENTICE HALL, New Jersey, 1991, pp. 81–163.

SUMMARY OF THE INVENTION

It is therefore an object of the present invention to provide a data transmission method which can solve the above problem in the prior art, that is, which perform such information filtering operation that allows flexible expansion of a large-scale computer distributed system covering a wide area, allows reduction of the amount of data flowing onto communication line, allows remarkable saving of communication costs, and allows reception of only information necessary for a receiver computer.

In accordance with an aspect of the present invention, there is provided a network system which has a plurality of sub-networks provided for a plurality of data groups set for a plurality of predetermined attributes of data and has a plurality of computers, and which comprises at least one computer connected to a first sub-network; at least one computer connected to a second sub-network; and one computer connected to the first and second sub-network. The at least one computer connected to the first sub-network includes a processor for processing data and attaching an associated contents code corresponding to the processed data and data group information indicative of a data group corresponding to the attributes of the processed data to ask a data transmission request; and a transmission controller connected to the processor for controllably transmitting a frame including the transmission sub-network, the contents code and the processed data to the first sub-network according to the data group information of the processed data, the transmission controller having a table in which the sub-networks to which data having the attributes corresponding to the data groups are to be transmitted, are stored. The one computer connected between the first and second sub-networks includes a transmission controller having a table in which a plurality of reception enable/disable judgement conditions of data reception are stored, for judging whether or not the contents code of the frame received from the first sub-network conforms to one of the plurality of data reception enable/disable judgement conditions, and, when the contents code of the received frame conforms to one of the plural-data reception enable/disable judgement conditions, for controllably transmitting the received frame to the second sub-network. The at least one computer connected to the second sub-network includes a reception controller having a table in which a plurality of reception enable/disable judgement conditions of data reception are stored, for judging whether or not the contents code of the frame received from the second sub-network conforms to one of the plurality of data reception enable/disable judgement conditions, and for storing therein the received frame having the contents code conforming to one of the plurality of data reception enable/disable judgement conditions. The one computer connected to the first and second sub-network may include a filter which has a table in which the contents codes differently set for the respective sub-networks are stored and which changes the contents code contained in the received frame from the first sub-network to the contents code set for the second sub-network to prepare the frame.

In accordance with another aspect of the present invention, there is provided a data transmission method for performing information filtering operation, which comprises the step of, when it is desired to transmit data having a plurality of attributes from a first computer to the transmission line, providing in transmission data on the transmission line an area for specifying information about determining the transmission range of data corresponding to the attributes of the transmission data and an area for specifying condition information about judging reception or non-reception of a data receiver computer;

by the user program of the first data transmitter computer, specifying the reception/non-reception condition information, information indicative of a data group set by the attributes of the data, and contents of the data, and then transmitting it to the first computer;

in a first computer, making correspondence between the judging condition information of the data reception or non-reception at the receiver computer, information on the data group corresponding to the other attributes of the data, and judging condition information of the data reception or non-reception at a receiver computer in the data group;

in the first computer, on the basis of filter information, acquiring the reception/non-reception judging condition information at the receiver computer for each data group, attaching to the transmission data both of the data transmission range information and the reception/non-reception judging condition information the receiver computer for each data group, and transmitting the data onto the transmission line;

in a second computer connected between the transmission lines in the system, when the transmission data flows through the transmission line, relaying transmitting the transmission data in the transmission range specified in the data on the basis of the transmission range information attached to the transmission data; and in a third computer, receiving the transmission data only when the transmission data is within the transmission range and only when the reception/non-reception judging condition at the receiver computer specified by the transmission data conforms to the condition indicated by the information, without paying any attention to the fact that the transmission data has a plurality of attributes.

The method further comprises a step of, in the first computer, attaching information for causing suppression of transmission of the same data to the other data group to data to be transmitted for each data group to provide directivity to flow of data between the data groups.

The method further comprises a step of, in the third computer, previously setting information for enabling reception of the transmission data having a plurality of attributes from the other data group not present in the transmission range, and receiving the transmission data only when the transmission data conforms to the receivable information or is in the transmission range as the data group to which the transmission data belongs and only when the condition indicated by the information conforms to the reception/non-reception judging condition at the receiver computer specified in the transmission data.

The method further may include:

in a plurality of gateway computers set in the transmission lines for the respective data groups, a step of making correspondence between condition information about judging reception or non-reception at a specified receiver computer, information about the data group corresponding to the other attributes of the transmission data, and condition information about judging reception or non-reception at the receiver computer in the data group;

a step of receiving the information flowing through the data group, acquiring the reception/non-reception judging condition information at the receiver computer for each data group on the basis of the transmission range information and the filter information attached to the transmission data, attaching thereto both of the data transmission range information for each data group and the reception/non-reception judging condition information at the receiver computer, and transmitting the transmission data in the transmission range specified in the transmission data; and in the second computer connected between the transmission lines in the system, when the transmission data flows through the transmission line, relaying transmitting the transmission data in the transmission range specified in the transmission data on the basis of the transmission range information attached to the transmission data.

In the present invention, at the time of transmitting data in the transmission system including the plurality of computers, the data is transmitted as attached to its head part with the broadcast range specified by the range information toward which range the data is transmitted to a computer group corresponding to specified one of a plurality of predetermined data groups, so that the data can be transmitted only to the necessary range and thus the communication load imposed on the transmission line can be lessened.

Further, since the transmitted data is filtered out on the basis of the information attached to the data reception/non-reception judging condition data (contents code) in the receiver computer through the filtering operation between the computer groups, the data can be transmitted between the computer groups with flexible expansion such as addition, deletion, etc. of the computer receiving the filtered data. In addition, this method also enables data transmission to the receiver-side computer belonging to a plurality of data groups.

BRIEF DESCRIPTION OF THE DRAWINGS

FIG. 1 is a block diagram of an arrangement of a network system in accordance with an embodiment of the present invention;

FIG. 2 shows a structure of a transmitting or receiving frame in the embodiment of the present invention;

FIG. 4 shows a structure of a data group table in accordance with the first embodiment of the present invention;

FIG. 5 is a flowchart showing a data transmitting procedure of the computer in the first embodiment of the present invention;

FIG. 16 is a flowchart showing a data transmission procedure involving the filtering operation of the first embodiment;

FIG. 19 shows a diagram for explaining data flows between data groups at the time of executing the filtering operation in the second embodiment;

FIG. 20 shows contents of a receiving data group table in the second embodiment;

DESCRIPTION OF THE PREFERRED EMBODIMENTS

Figure 3:
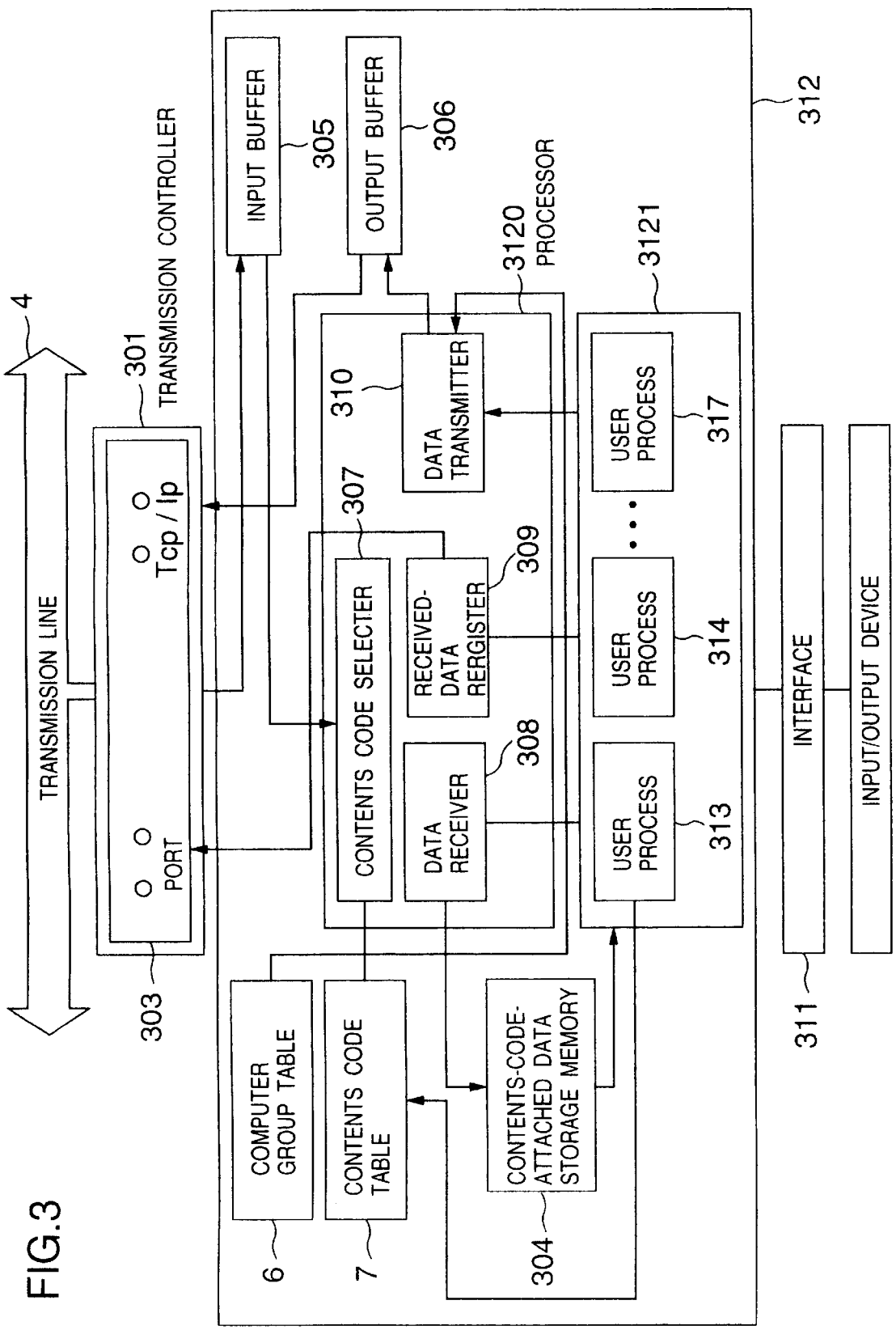
FIG. 3 is a block diagram of an arrangement of a computer in accordance with a first embodiment of the present invention.

Embodiments of the present invention will be detailed below with reference to the accompanying drawings.

FIG. 1 shows an arrangement of a network system in accordance with an embodiment. As illustrated, the network system includes a plurality of transmission lines 4, 41, 42 . . . each having a sub-network, a plurality of inter-network connectors 5 for connection between the transmission lines 4, 41, 42 . . . , computers 201 to 207 connected to the transmission line 4, and computers 211 to 217 connected to the transmission line 41.

With such an arrangement as mentioned above, an address for identifying a position in the transmission lines is given to each of the computers, and transmission line addresses for identifying their positions in the network are given to the transmission lines 4, 41.

The transmission line address corresponds to a sub-network address when TCP/IP is installed as a standard protocol in computer networks.

The inter-network connector 5, which connects the adjacent transmission lines, passes data between the transmission lines according to the transmission line address attached to the data. Such inter-network connectors 5 as to play such a role include a bridge for simply supplying a signal, a router for selectively connecting a path, a gateway for converting an address for its connection and a computer for performing contents operation. For both of the transmission lines connected by the bridge of the above inter-network connectors, the same transmission line address is set. The router and gateway function to perform data transfer between transmission lines on the basis of the transmission line addresses of transmission lines connected thereto as well as the transmission destination transmission line address of the transmission data. Further, the computer may be connected not only to a single transmission line but also to a plurality of transmission lines.

The following explanation will be made in connection with an example wherein the gateway is used as the inter-network connector 5.

The computers perform data transfer therebetween through the transmission lines 4, 41 and internetwork connector 5.

The computers include respectively a processor and a transmission controller. The transmission controller has a plurality of transmitters and receivers to which respectively different addresses are assigned. The processor issues as necessary a signal to the transmission controller to ask the controller to transmit the data. In response to the request from the processor, the transmission controller stores the data in a frame of a predetermined format to cause a suitable transmitter to transmit the data onto a transmission line connected thereto. The receiver of the transmission controller receives the data directed to its own computer and sent to its own receiver from the transmission line, and then passes it to the processor.

The processor in turn previously registers correspondences between computer group names and transmission destination information belonging to the computer groups of the computer group names. The computer groups are previously registered depending on, e.g., data attributes, such as areas requiring data, data importance, transmission frequency and necessity of high-speed communication. The correspondences between the computer group names and transmission destination information are shared between the respective computers within the network system. Also, the transmission destination information specifies the address or addresses of one or a plurality of transmission lines to which a computer to receive the data is connected. For address or addresses of the specified transmission line or lines, an address or addresses of one or a plurality of receivers can be specified.

The processor sends the data as necessary to the transmission controller, together with the contents code as well as the transmission destination information already registered as associated with the computer group name of the computer group belonging to the data in question, to thereby ask the transmission controller to transmit the data. The contents code is a code indicative of the type of data to be asked to transmit, and correspondences between the data types and contents code values are shared between the computer systems within the network system. In this connection, a character string (name) may be used as the contents code. The value of the contents code can also be commonly used for each computer group. In this case, this means that different computer group may indicate different contents even with the same value of contents code.

The transmission processor, when asked to transmit the data, prepares, for transmission destinations indicated by the transmission destination information, a frame made up of data 104 attached with a transmission destination computer group name or group address 1 as a header for uniquely specifying a transmission line address indicative of transmission destination information and the address of the receiver, a contents code 2, and a transmission originator address 3, as shown in FIG. 2; and then specifies the broadcasting within the transmission line in question to transmit the data to the appropriate internetwork connector. This frame is transmitted by the internetwork connector to the transmission line indicated by the transmission line address in the transmission destination address or transmission range information 1. In this connection, the data transmission range information 1 may comprise various sorts of information prepared by group setting methods. First, for one group, the transmission range is restricted by the transmission line address; second, for another group, the transmission range is restricted by receive-computer receiving port number; and last, for the remaining one group, the transmission range is restricted by a combination of the above two elements. In the respective cases, the transmission range information 1 is set in a data format.

The above appropriate internetwork connector refers to the one provided in the transmission line corresponding to the frame transmission destination.

According to the correspondences between the computer group names and transmission destination information shared between the computers within the aforementioned network system, the processors of the respective computers set one or a plurality of address receivers which is or are specified, with respect to the address of the transmission line connected to their own, by the transmission destination information of a group name of the computer group belonging to the data to be received by their own receivers, in their frame receivable state. The receiver in which the frame receivable state is set, takes one of the frames broadcast onto the connected transmission line which includes the address of its own receiver, and passes the contents of the frame to the processor. The processor judges the received contents code and, when judging that the code is to be received, accepts it.

Accordingly, the frame having the contents code added therein is transmitted only onto the transmission line to which the computer for the data to be received is connected. Further, this frame is received only by the computer which is connected to the transmission line to receive the data. Each computer which received the frame judges reception or non-reception of the data according to the contents code.

A specific embodiment of such a network system will be explained below in connection with an example in which the network system uses ICP/IP as a standard communication protocol.

In this system, the transmission lines 4, 41 correspond to sub-networks of such a network as shown in FIG. 1.

Assume now that this system follows TCP/IP, the sub-networks 4, 41 have already-set sub-network addresses by which their positions in the network system are uniquely specified, and the respective computers have already-set host addresses by which the positions of their computers on the transmission lines are uniquely specified. When the computer is connected to a plurality of transmission lines, the computer has host addresses for the respective transmission lines.

Shown in FIG. 3 is a configuration of one of the computers.

As mentioned above, the computers have each a processor 312 and a transmission controller 301. Connected to the processor 312 is a console through an interface 311. The console is such an input/output unit offering a user interface as a keyboard or a display.

The processor 312 has a communication controller 3120 for performing communication control and a processor 3121 for performing various sorts of data processing operations. The communication controller 3120 has an input buffer 305, an output buffer 306, a contents code-added data storage memory 304, a contents code selector 307, a data receiver 308, a received-data register 309, a data transmitter 310 and the aforementioned processor 3121. The input and output buffers 305 and 306 are used to perform data transfer between the transmission controller 301 and processor 312.

The processor 312, which actually comprises a general computer including a memory and a processor, implements various sorts of processes on the processor 312 by executing various sorts of programs on the processor. That is, in reality, the communication controller 3120 is implemented as a communication control process realized by executing a communication control program, whereas the processor 3121 is implemented as a single or a plurality of user processes realized by executing a user program.

Meanwhile, the transmission controller 301 following TCP/IP is provided with a plurality of ports to which respectively different addresses are given, so that the transmission controller 301 performs frame transmitting or receiving operation with use of the port specified by the processor 3121. This port corresponds to the aforementioned receiver or transmitter.

Based on TCP/IP, transmission of data to a specific port of a specific computer on a specific transmission line is carried out with use of the sub-network address, transmission destination host address and port address as a transmission destination address.

FIG. 4 shows contents of a computer group table 6.

As illustrated, information on one computer group include a computer group name 1, a sub-network address 8 and a port address 9.

In FIG. 4, more specifically, with regard to a computer group name DF-1, data about this group is registered to indicate that a sub-network address Sub-A and a port address P1 are to be transmitted as the transmission destination address.

Similarly, with respect to a computer group name DF-2, data about this group is registered to indicate that, for the sub-network address of a sub-network address Sub-B, a port address P2 is to be transmitted as the transmission destination address; whereas, for the sub-network address of a sub-network address Sub-C, a port address P3 is to be transmitted as the transmission destination address.

With regard to a computer group name DF-3, data on this group is registered to indicate that, for the transmission line of the sub-network address Sub-B, a port address P4 is to be transmitted as the transmission destination address and a port address P5 is to be transmitted as the transmission destination address. That is, this means that two ports can be used for the data transmission to the sub-network address.

It is also possible to arrange the table in such a manner that a plurality of sub-network addresses are registered for a single group name and a plurality of port addresses are registered to each sub-network address.

Explanation will be made below as to the operation of the network system in accordance with the first embodiment of the present invention.

Prior to data transmission or reception, each computer sets the computer group table 6, a contents code table 7 and a receive port.

Explanation will first made as to these setting operations.

First of all, for example, correspondences among the data group names, the sub-network and port addresses to be used as the transmission destination addresses at the time of transmitting the data with respect to all the computers used within the network system, are transmitted in a broadcast form from any one computer to other computers. Alternatively, correspondences among the group names and the sub-network and port addressed to be used as the transmission destination addresses at the time of transmitting the data with respect to the computer groups to or from which one computer possibly transmits or receives data, are transmitted from any one computer to other computers.

Correspondences among the group names received by the computers and the sub-network and port addresses to be used as the transmission destination addresses at the time of transmitting the data, are sent to the received-data register 309 via the transmission controller 301 and via the data receiver 308 within the processor 312. The contents of the received-data register 309 is registered in the computer group table 6.

The received-data register 309 then recognizes the address of the sub-network connected to its own computer and reads out one of the port addresses registered for the transmission line address from the computer group table 6. And one of the ports of the transmission controller 301 corresponding to the readout port address is set in its receivable state. Modification of the contents of the computer group table 6 of the computers is realized in such a manner that, for example, when it is instructed to modify information on the group including a given computer, the contents of the modification is transmitted to all the computers in the broadcast form, the modification-instructed computer transmits the modification contents to one management computer, the management computer transmits the modification contents to the other computers, the computers having received the modification contents modify the contents of their own computer group tables 6 based on the received modification contents to correspondingly change the setting of the ports.

In this connection, the setting and modification of the computer group tables 6 of the respective computers may be made, with respect to the groups of data which are possibly transmitted from or received by the computer, by a user of each computer entering through the console correspondences among the group names and the sub-network and port addresses to be used as the transmission destination addresses at the time of transmitting the data. In this case, each user is responsible for the uniquely naming of the corresponding sub-network and port addresses of each computer group.

Meanwhile, the received-data register 309 registers in the contents code table 7 the contents code of data which is necessary to be received in its own computer for its processing. This registration is carried out in response to the specification of, e.g., the user program or user processes 313 to 31n.

The operation of the system in the data transmission mode will now be explained.

Shown in FIG. 5 is a procedure of the data transmission mode for each computer.

Figure 6:
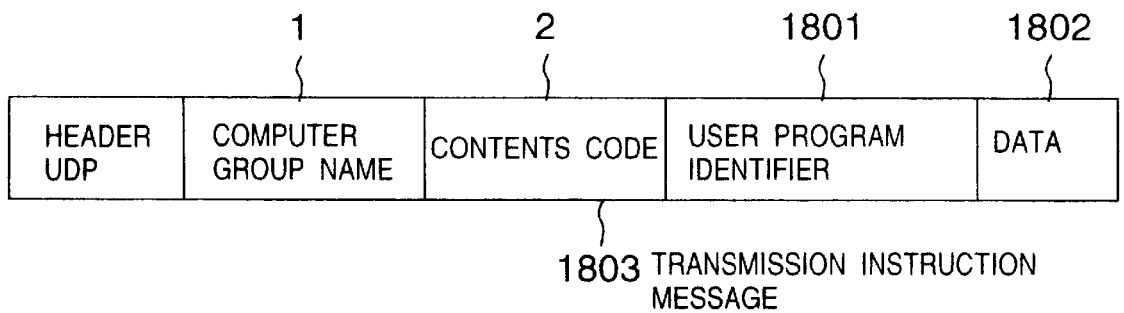
FIG. 6 shows a structure of a transmission instruction in the first embodiment of the present invention.

In response to an instruction issued from the input/output unit or console through the interface 311, the user processes 313, 314, . . . sends to the data transmitter 310 a data transmission instruction having the computer group name 1, contents code 2, data 104 and user process identifier 1801 set as shown in FIG. 6 (step 602). The user process identifier 1801 is set, when an abnormality took place in the subsequent transmitting operation, to inform the user processed of the occurrence of the abnormality.

The data transmitter 310 refers to the computer group table 6 to acquire the sub-network address 8 and port address 9 registered as associated with the group name specified by the transmission instruction (step 603), sets as the transmission destination address the sub-network address 8 and port address 9 corresponding to the group name specified by the transmission instruction, adds the contents code specified by the transmission instruction thereto, specifies broadcast within the sub-network address 8, and transmits it to a suitable gateway through a suitable port of the transmission controller 301 (step 605). When a plurality of port addresses are registered for a single sub-network address, a frame is prepared and transmitted for each sub-network address. When a plurality of port addresses are registered for a single sub-network address, a frame is prepared and transmitted for each port address. In this case, the term "suitable gateway" refers to a gateway present on the line connected to the sub-network of the frame transmission destination. Further, in TCP/IP, the specification of the broadcast to the sub-network specified by the sub-network address included in the frame destination address is realized actually by including a specific value in the destination address as a host address.

Also included in the frame as the transmission originator address 3 are the sub-network address 8 of the transmission line connected to its own computer, the own computer host address and the port address 9 of the port used for the transmission.

Figure 7:
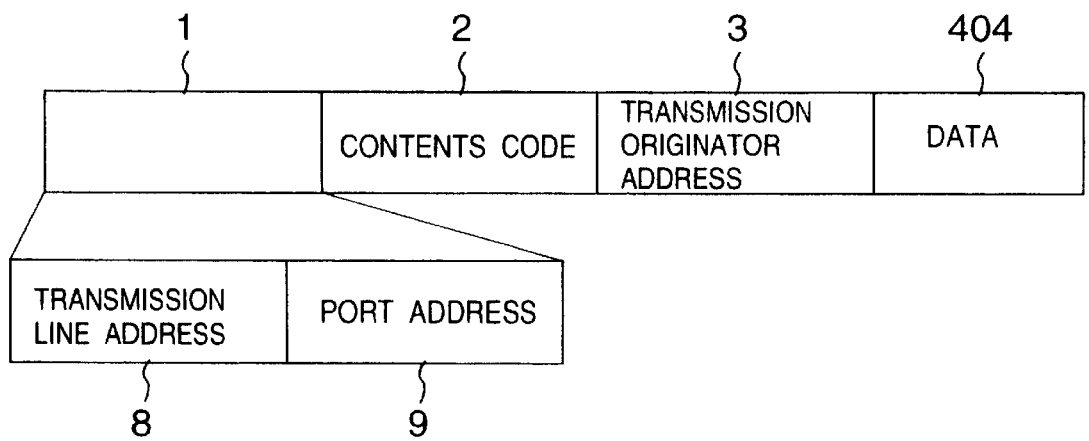
FIG. 7 shows a structure of a frame in the first embodiment of the present invention.

FIG. 7 shows a structure of the frame thus transmitted.

This transmitted frame is transmitted by the gateway to the sub-network specified by the sub-network address within the transmission destination address and broadcast in the sub-network.

Each port having the frame receivable state set therein in each computer takes one of the broadcast frames containing its own port address as the transmission destination address, and passes the contents of the frame to the contents code selector 307 of the communication controller 3120. The contents code selector refers to the contents code table 7, and when the contents code within the received frame is already registered in the contents code table 7, sends the frame contents to the data receiver 308. When the frame contents is not registered yet, the contents code selector discards the contents of the frame.

The data receiver transmits the contents code and data to the user process requiring the data through the contents code-added data storage memory 304.

The user processes 313, 314, . . . have sent to the data transmitter 310 the data transmission instruction having set the computer group name 1, contents code 2, data 104 and user process identifier 1801 therein as shown in FIG. 6 in the first embodiment. However, when the group is uniquely determined by the contents code, it is possible for the user processes 313, 314, . . . to send to the data transmitter 310 only the data transmission instruction having the contents code 2, data 104 and user process identifier 1801 set therein to determine in the data transmitter 310 the computer group name of the group associated with the data according to the contents code.

Figure 8:
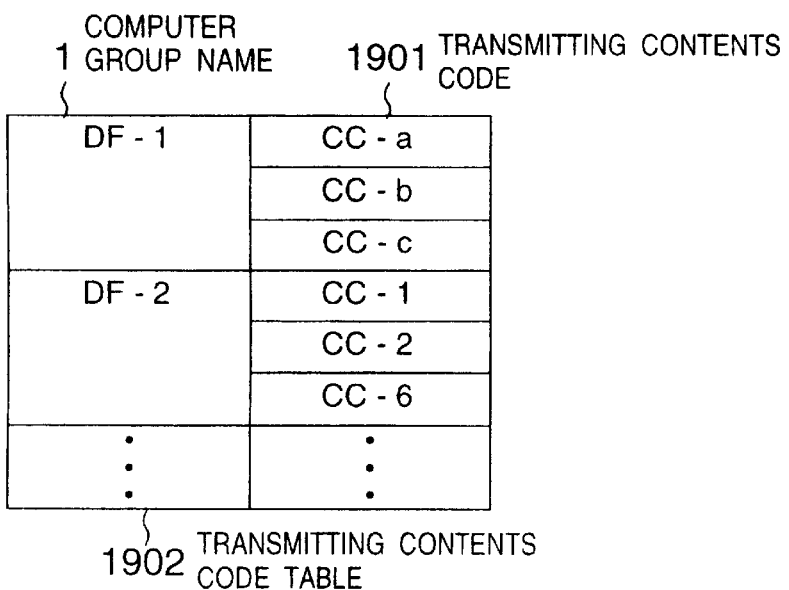
FIG. 8 shows a structure of a transmission contents table in accordance with the first embodiment of the present invention.

That is, it is possible to previously provide in the data transmitter 310 such a transmission contents code table as shown in FIG. 8 having correspondences between the contents codes and data group names registered therein.

Explanation will next be made as to a filtering technique of transmission data between the computer groups with the transmission range restricted for the purpose of realizing the flexible expandability of the aforementioned network system and the reduction of communication load thereof.

As already mentioned above, the computer group for transmitting or receiving transmission data includes a plurality of computers grouped based on the different types of hardware of transmission lines such as LAN, frequency (synchronization) of a plurality of data transmissions, whether to re-transmit the same data when a transmission error occurs. The transmission range is restricted when, with respect to a plurality of computers grouped according to different attributes and a group of devices connected thereto, one or more transmission lines or data receiving ports within the receiving computers or combinations thereof are specified as their group transmission destinations. The filtering operation (which will be explained later) may include the filtering operation based on the transmission destination address attached to the transmission data and the filtering operation based on information attached to the data and relating to conditions of judging reception or non-reception of data in the receiving computer.

The term "information relating to conditions of judging data reception or non-reception" refers particularly to the destination computer group address in communication to the group or the contents code indicative of the contents of transmission data in the contents code communication.

In the communication system using the contents code, the transmitting computer attaches to the transmission data the contents code corresponding to the contents of transmission data and then transmits the resultant data without recognizing the address of the party. A receiving computer sets data to be received on the basis of the contents code of the transmission data. Thus, the receiving computer can execute its operation without recognizing the position of itself and number of the computers as an transmission originator of the transmission data while taking only the data contents into consideration. Since each computer receives data while not specifying the data transmission originator, it is only required to broadcast the transmission data within the system and for the receiving computer to receive the data alone attached to the coincidence contents code. As a result, the data receiving operation can be carried out independently of the expansion of the system such as addition or deletion of a transmitting computer.

Figures 9A, 9B:
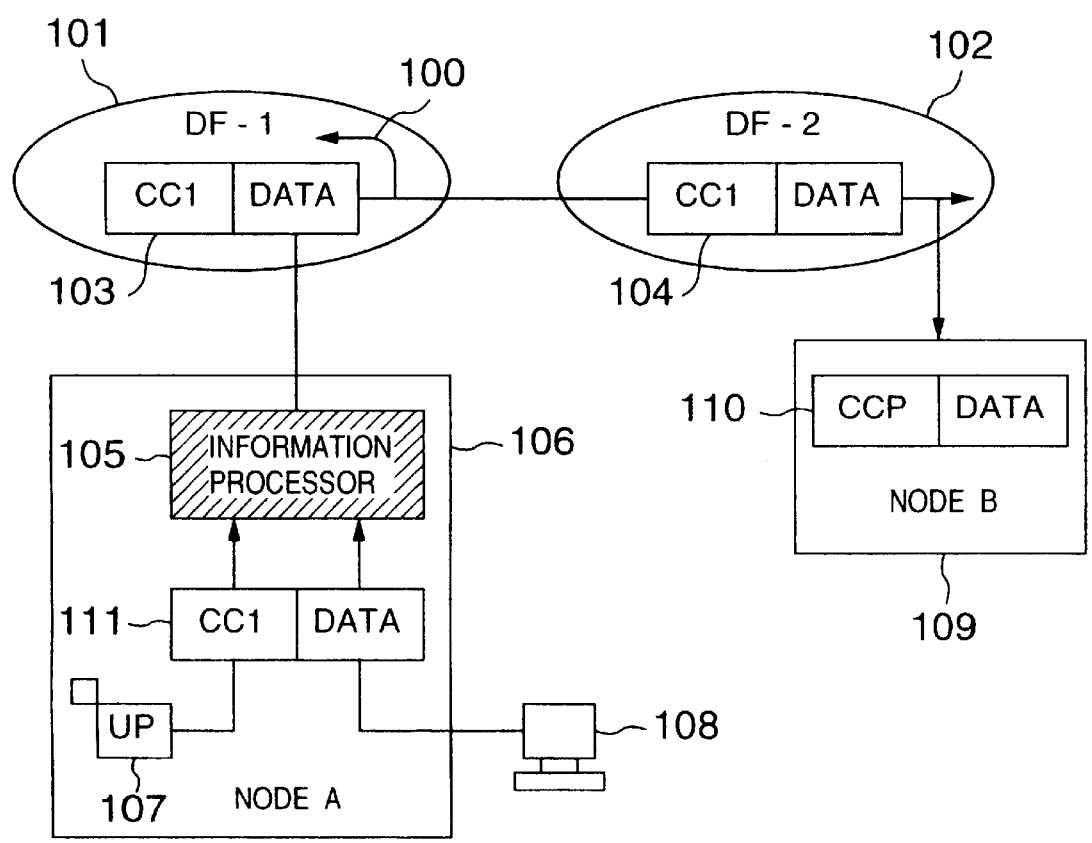
FIGS. 9A and 9B are diagrams for explaining the contents code filtering operation of the first embodiment of the present invention.

FIGS. 9A and 9B schematically show a diagram for explaining the filtering operation of the contents code and also a filter table.

In a system using the contents code communication mode, the computer group can set for each attribute of transmission data. When a transmission range corresponding to a group is set as the property of the group, the broadcasting of the transmission data within the system is restricted in a range limited by the data, thus advantageously lightening the network load of the system. In this case, the group is defined by the transmission lines, the receiving ports of the computers or combinations of the both as physical elements prescribing the transmission range of the transmission data.

In FIG. 9A, data flowing within the system hold either one of two different attributes, and on the basis of these attributes, the computer group DF-1 (101) or DF-2 (102) is set as a transmission range. An arrow 100 indicates operation of sending data to the computers within the group. That is, a computer node A can receive only the data flowing through the computer group DF-2 (102), while node B can receive only the data flowing through the computer group DF-2 (102). In reality, judgement of whether or not each node receives the transmission data is carried out by comparing with the received contents code attached to the data.

This transmission method is featured in that the data selectively being capable of being received by the node A within the group DF-1 (101) is limited to the data flowing through the group DF-1 (101) and the data flowing through the group DF-2 (102) is prevented from flowing through the group DF-1 (101), thus enabling selective data reception. Such a state that only the transmission data from the specific computer group can be selectively received, is defined as the node A (106) having a receive access authority to the group DF-1 (101).

However, it is difficult to design such a system that the node having the receive access authority to the specific computer group execute the operation while fully shielding information on the other computer groups. If such a filtering method is realized that part of information flowing through the other computer groups is selected and received by its own computer, then a system using the computer group and contents code will be designed more flexibly. In this conjunction, the term "filtering" refers to select out only necessary data out of received data and transmitting the received data to other computer groups of the data group.

In the case where such a filtering method as mentioned above is employed, even when the computer groups are expanded, only necessary data can be selectively transmitted with use of the filtering method applied to the prior art system from its computer group to an expanded part, whereby flexibility can be achieved between the newly added part and the prior art system. More in detail, in the case where the computer group comprises a single transmission line, when it is desired to add a new transmission line to the data transmission line in operation, part of data flowing the prior art transmission line which is to be transmitted to the newly-added transmission line can be selectively transmitted by the above filtering method.

In the filtering method in which data is received in the form of extraction and conversion of part of information between groups, only necessary part of data flowing through other computer groups can be received. Therefore, since the load of the selective data reception is added only by the data part, the load of selective reception become lighter than that in the prior art. This is suitable when it is desired for a computer within a group to refer to only part of data of the other group for its selective reception.

When a computer is, e.g., the node A (106), data 111 created at a user process or program (UP) 107 or an input/output unit or terminal 108 is passed to an information processor 105 having a filter table 1. Set in the filter table 1 are a transmission destination data group name 2 and a contents code 3 thereof with respect to each transmission data, as shown in FIG. 9B. This table is registered so that, when data having the data group name DF-1 and a contents code CC1 is output from the user program (UP) 107 or terminal 108, the data having a contents code CCP is automatically output to the data group DF-2 through the filtering operation (which will be explained later). In the case where a default group (recognized by an application) for determining an automatically transmitting data group is previously set for the user program 107, terminal 108 or node A 106 which issued the data, when the data 111 comes at the information processor 105, the system searches the filter table 1 for the default group name therein to search the contents code CC1 of the data 111. The system then refers to the contents code CCP in the other data group DF-2 associated with the contents code CC1 to create a format for each data group. When a method of attaching a data group name (to which the data 111 is to be transmitted) to the data 111 is used, the system refers to the filter table 1 based on the attached group name DF-1.

In the information processor 105, a data format is generated as the data 103 of the contents code CC1 for the computer group DF-1 (101) or as the data 104 of the contents code CCP for the computer group DF-2 (102). Thereafter, each data is specified in its data group transmission range and then transmitted.

In the example of FIG. 9A, the operation of injecting the data of the computer group DF-1 (101) into the computer group DF-2 (102) with use of the filter table is carried out as the filtering operation. The injected data is recognized by the receiving computer as the data of the computer group. Thus, when it is desired to change the filtering information, it is only required to change the information of the filter table 1 and it is unnecessary to change the receiving contents code of the receiving computer. More specifically, in FIG. 9A, when the node B (109) having a receiving access authority to the computer group DF-2 (102) receives data, the node recognizes the data 111 as the data of the contents code CCP now flowing through the computer group DF-2 (102). In other words, a receiving computer in a computer group different from a transmitting computer group recognizes data with the contents code different from the transmitting computer group. The data 103 and 104 flowing as filtered between the computer groups are set to have the contents codes CC1 and CCP different for the respective computer groups, but the data contents A is the same.

Figure 10:
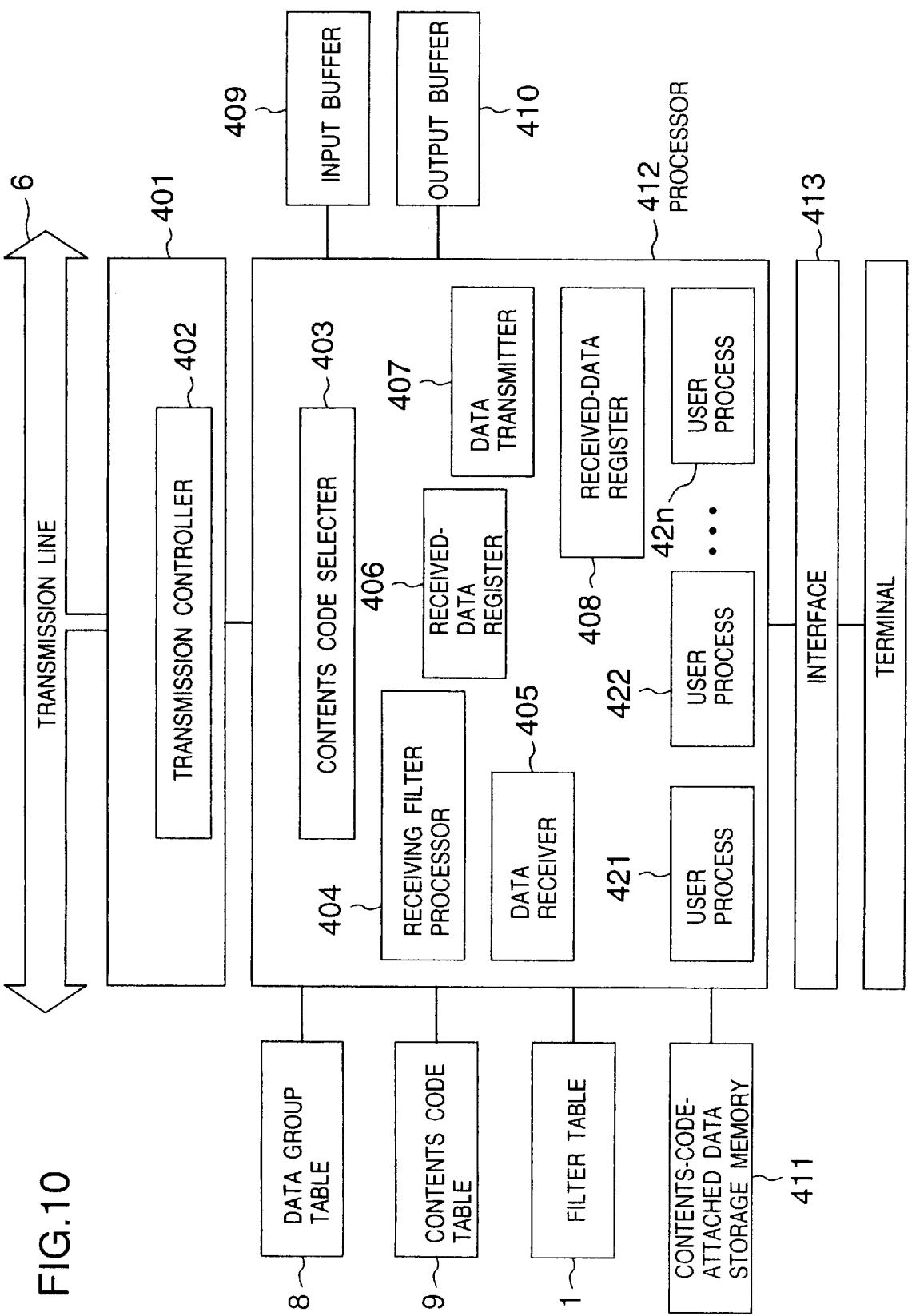
FIG. 10 shows an arrangement of an interior of the computer of the first embodiment.

Referring to FIG. 10, there is shown an internal arrangement of a computer in the first embodiment.

A processor 412 is connected to a transmission line 6 through a transmission controller 401. Arranged within the transmission controller 401 is a receiver which can physically receive only transmission data corresponding to the transmission range information within the computer, i.e., a data group selector 402 which can set a plurality of ports. The processor 412 is connected to a terminal via an interface 413. Also connected to the processor 412 are an input buffer 409, an output buffer 410, a data group table 8, a contents code table 9, a filter table 1 and a contents-code-attached data storage memory 411. Provided within the processor 412 are a contents code selector 403, a data receiver 405, a received-data register 406, a data transmitter 407, and transmitting filter processor 408. Though a receiving filter processor 404 is also provided within the processor 412, the processor is intended to be used in a second embodiment. Also provided within the transmission line 41 are at least two user processes (UPs) 421 to 42n which can execute an operation.

Registered in data group table 8 are the data transmission range information 5 which correspond to the data group names 2. In the illustrated example, the information of the data group table 8 is unified among all the computer of the network system and the names 1 of all the data groups within the system and the data transmission range information are registered in the table. One of means for unifying the registration information of the table is, when the information of the data group within a computer was changed, to broadcast the changed information to the entire system to ensure uniqueness of all the computers within the system. Another of the means for unifying the registration information of the table is to install a computer for collectively managing the data group information within the system and, when the data group information of a computer was changed, to broadcast the changed information only from the management computer to the computers within the system to thereby retain the uniqueness.

Two modifications of the information of the above data group table will be explained below.

In the first modification, the information of the data group table 8 holds data group information required only by the computers within the system. In this case, the above data group contains, in addition to the currently belonging data group, a data group which may possibly belong to in the future. In this modification, the information of the data groups within the system are uniquely managed in the system as in the method of the first embodiment.

In the second modification, the information of the data group is set independently of the respective computers. In this case, with respect to the guarantee of uniqueness of information within the system, users who handles the respective computers and the network system are responsible for it.

In FIG. 10, the data group selector 402 is arranged to set a plurality of receivers which can physically receive only the transmission data corresponding to the transmission range information 5, so that, when receivers corresponding to the data group including the computer are set, only the transmission data of the belonging data group can be physically received. As a result, the quantity of transmission data to be physically received can be limited to improve computer data reception performance.

Next, the contents code selector 403 in FIG. 10 refers to the contents code 3 attached to the data and also to the contents code necessary for its own computer already registered in the contents code table of its own computer, and, only when the former contents code coincides with the latter one, receives the transmission data. The data receiver 405 transmits the received data to the terminal through the interface 413. Thus, one of the computers in the data group having a data reception access authority can receive only the transmission data necessary for its own computer and can judge reception or non-reception of the data through two-stage judgement of the data group and contents code.

When a data transmission request was issued from the user processes 421 to 42n, the data transmitter 407 accepts the instruction. creates a message format and transmits the data. In this case, when the contents code attached to the transmission instruction from the user programs is present in the filter table, the transmitting filter processor 408 performs its filtering operation (which will be explained later). When the transmitting filter processor 408 passes to the data transmitter 407 information on transmission data for each data group generated through the filtering operation, the data transmitter 407 prepares a data format based on the information and transmits it onto the transmission line 6. Details of the above will be explained in FIGS. 15A, 15B and FIG. 16.

In the data transmission mode, since the computer transmits data with the address of the party computer not specified and with the contents code specified, the computer can transmit the data without recognizing the number or position of the transmission destination computers. As a result, flexible expansion of computers within the data group can be realized.

That is, when it is desired to newly add, delete or change a belonging data group in a computer, the received-data register 406 performs its registering operation. First, reference is made to the data group table 8 to refer to part of the information of the new belonging data group corresponding to the group-associated receiver. Based on the information, the data group selector 402 sets or releases a new receiver corresponding to that data group.

The receiver corresponding to the data group will be referred to as the port, hereinafter. More specifically, this means that such a method can be carried out as to set the receiver as the port employed in TCP/IP as a UNIX standard network communication protocol. When this method is employed, the present invention can be implemented on TCP/IP as the computer network standard protocol.

Figures 11A, 11B:
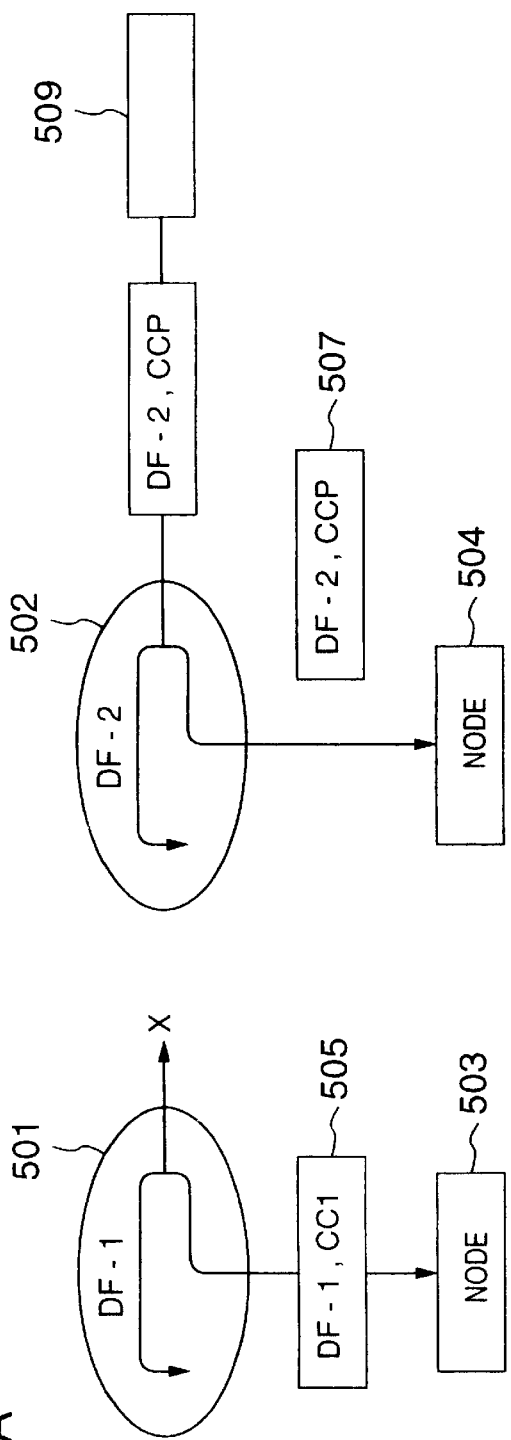
FIGS. 11A and 11B are diagrams for explaining data flows between data groups in the first embodiment.

FIGS. 11A and 11B schematically show data flows between data groups in the first embodiment.

In the drawings, the system is assumed to comprise data groups DF-1 (501) and DF-2 (502) and nodes A (503), B (504) and C (509). The data group is defined as an assembly or set of transmission data. Thus, in the case where a name is set for the contents code corresponding to each data, when a system having a name unique to each data group, that is, such a contents code structure 508 as shown in FIG. 11B is previously set, a system using data groups can be easily designed.

Accordingly, in the subsequent explanation, it is supposed in a system of each embodiment that the contents code structure is set for each data group.

In such a contents code structure as shown in FIG. 11B, this indicates that transmission data of the contents codes CC1 and CC2 are flowing through the data group DF-1 (501). On the other hand, transmission data of the contents codes CCP and CCQ are flowing through the data group DF-2 (502). In each data group, in order to maintain a unique contents code structure, the contents code of each transmission data in the system never belongs to a system of a plurality of data groups.

In this way, the characteristic having the contents code structure unique to each group is because such a function as not to transfer data between the data groups is applied to each data. Since data transfer is not effected between the data groups, there is an advantage that independent operation can be executed in each group and each group can easily execute the addition or deletion of node, user process (UP) and transmission data. In more detail, in FIG. 11A, data 505 of the contents code (DF-1, CC1) issued from the node A (503) will not be transmitted out of the transmission range of the data of the data group DF-1 (501). When the node C (509) issued a contents code (DF-2, CCP) 507 to the data group DF-2 (502), the node B (504) can receive the data with its contents code (DF-2, CCP) 507. Since the data will not flow through the data group DF-1 (501), however, the node A (503) having a data reception access authority to the data group DF-1 (501) cannot receive that data. When such a characteristic is given to each data group, there can be realized a contents code name system independently of the respective data groups. Since the contents codes within the system can be easily managed, when it is desired to design a system having data groups set therein, data flow design based on the contents codes can be efficiently realized.

Such a system as to have an independent contents code structure for each data group have been explained in the foregoing. In reality, however, it is difficult to design such a system as to have mutually independent data groups and as not to transfer data between the data groups, which is essentially the same as the design as discrete systems. It is the utmost importance to perform cooperative processing operation between the data groups by setting a plurality of data groups within the same system, which is one of the major reasons of using the system based on the data groups. The term "cooperative processing operation" as used therein includes (a) the cooperative operation between data groups based on the same data shared between the data groups, and (b) the cooperative operation between a plurality of data groups based on setting of nodes having a transmission/reception access authority to the data groups set therein.

Explanation will next be made as to the cooperative operation between a plurality of data groups having the same data sharing between the data groups, by referring to FIGS. 11A and 11B and FIG. 12. And the cooperative operation between a plurality of data groups based on setting of nodes having a transmission/reception access authority to the data groups set therein, will be explained later.

One of methods for sharing the same data between a plurality of data groups is to, at each (e.g., node A (503), node C (509) of nodes within the system, hold information on the data shared between the data groups and transmit the shared data in the respective data transmission ranges of the shared data groups at the time of sending or receiving the shared data. In the present embodiment, a table in which information on data shared between data groups is set, is defined as a filter table (refer to FIG. 12).

Figure 12:
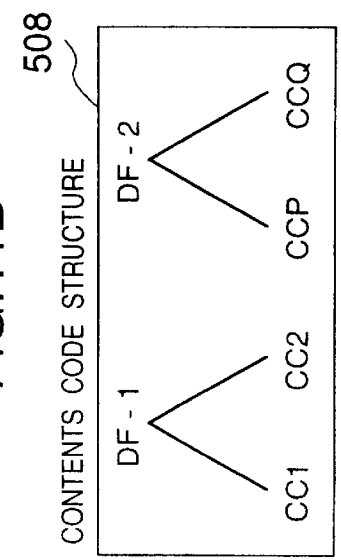
FIG. 12 shows contents of a filter table in the first embodiment.

FIG. 12 shows a data structure of a filter table used in the present invention.

The filter table includes, as its constituent elements, data group names 2 and contents codes 3, which correspond to combinations of data group names sharing associated data and the contents codes of the associated data. In the case of FIG. 12, more specifically, there are present in the system 3 data groups DF-1 (601), DF-2 (602) and DF-3 (603), so that data of a contents code ccl flows in the data group DF-1 (601) and in the data group DF-2 (602), flows as data of a contents code ccP (refer to 604 in FIG. 12). In this case, since no contents code is registered for the data group DF-3 (603) (refer to 604 in FIG. 12), the data is not shared by the data group DF-3 (603), that is, the data does not flow therein.

Data of a contents code cc2 flows in the data group DF-1 (601), and in the data group DF-3 (603), flows as data of a contents code ccA (refer to 605 in FIG. 12), and in the data group DF-2 (602), the data does not flow.

There are two ways of setting information in the filter table. One of the ways is to set both of the contents codes of filtering originator and destination in the transmission originator node. In this case, it is necessary to previously set the same filtering information even in nodes of the transmission originator data group as the filtering destination. The other method is to, at the time of registering the table, determine the filtering information by the transmission destination node and transmit it therefrom to register the information in the table. In this method, it becomes unnecessary for the transmission originator to inquire of all filtering information within the system, thus achieving easy realization of conformability management between sender and receiver nodes of the filtering contents code.

Figure 13:
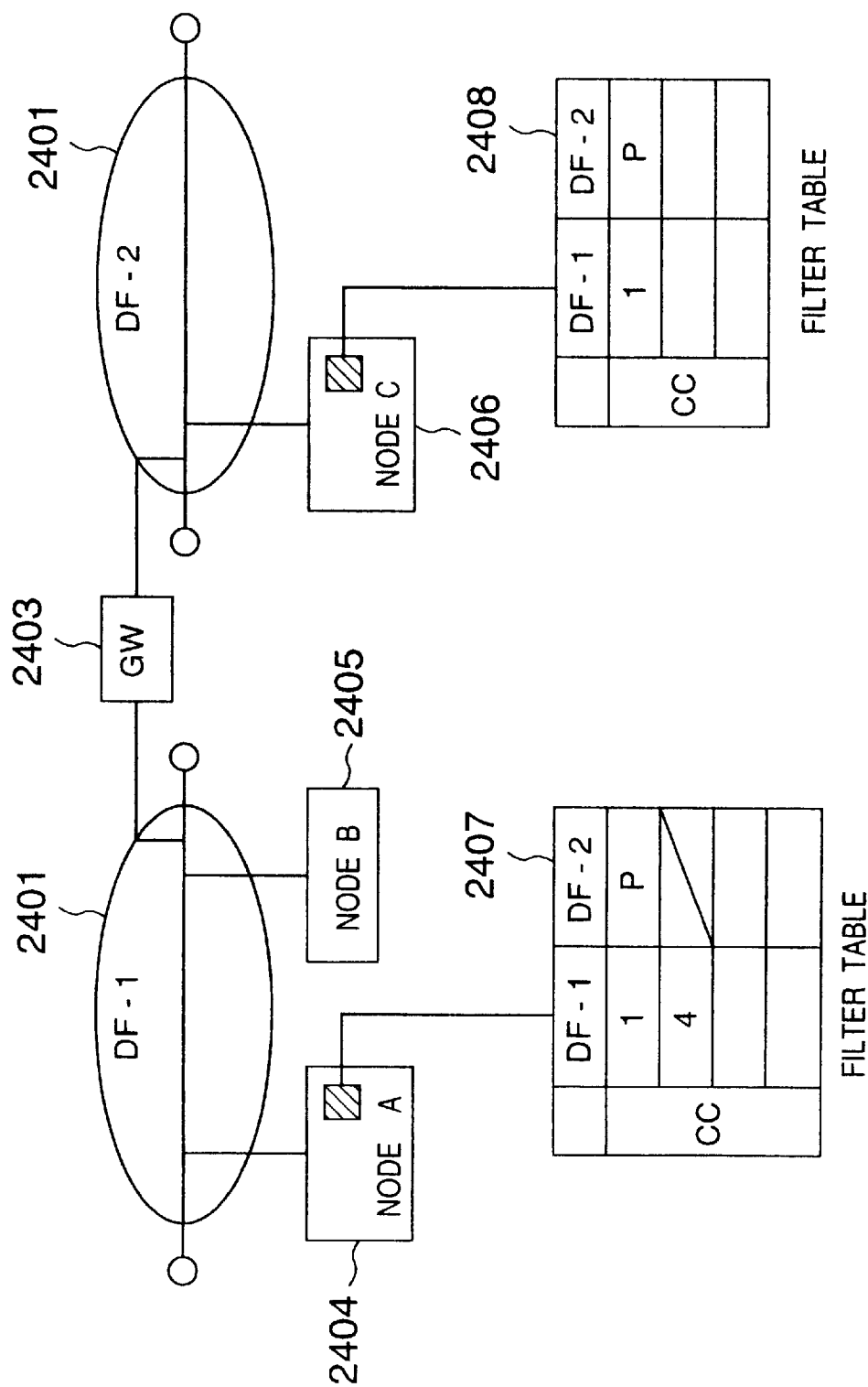
FIG. 13 is a diagram for explaining function of information in the filter table in the first embodiment of the present invention.
Figure 14:
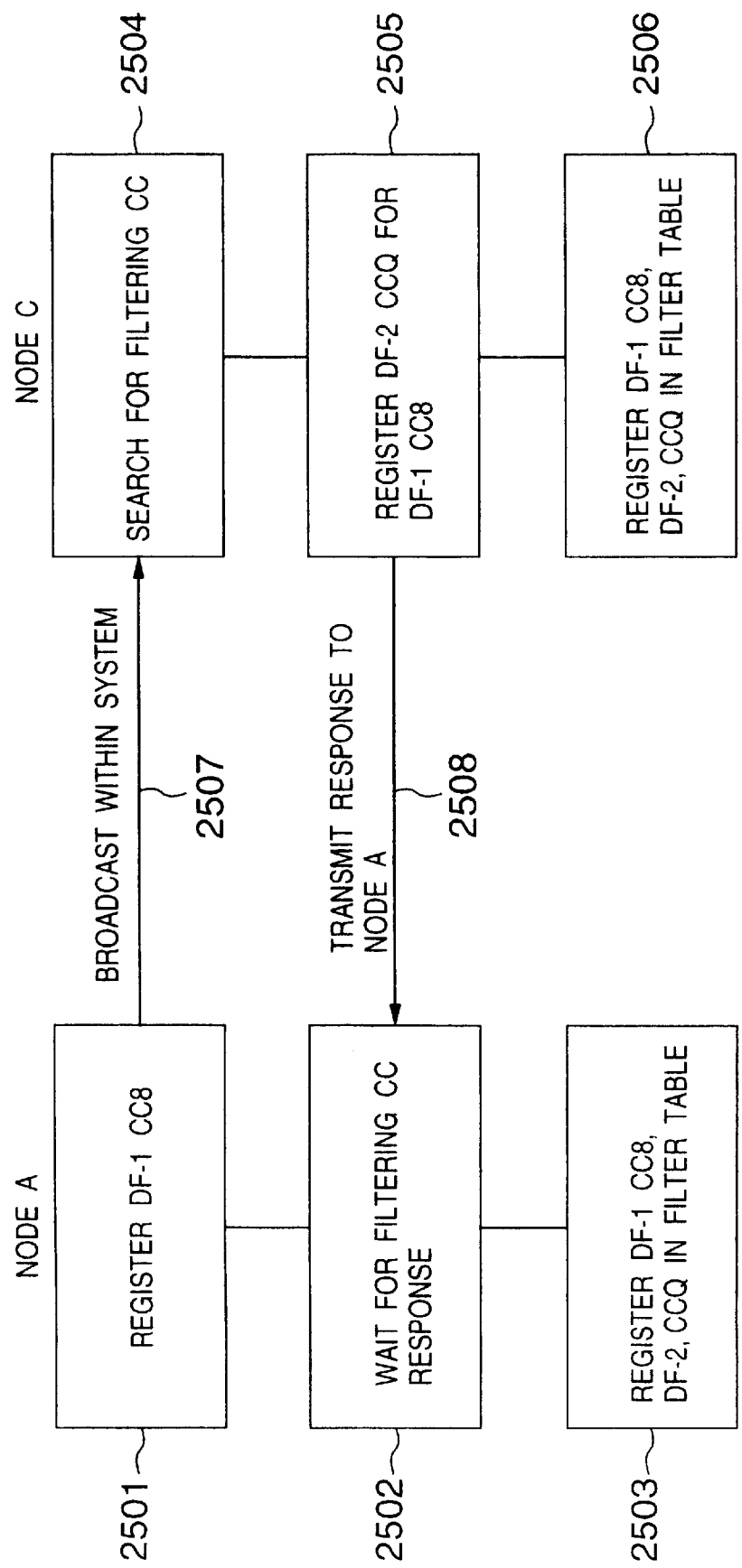
FIG. 14 is a flowchart for explaining function operation of the information of the filter table in the first embodiment.

FIG. 13 is a diagram for explaining the conformability function of filter table information, and FIG. 14 is a flowchart for explaining the operation of the conformability function of the filter table information.

In FIG. 13, two data groups data group DF-1 (2401) and DF-2 (2402) are present which are connected with nodes A (2404) and B (2405) and a node C (2406), respectively. In the illustrated example, a filter table 2407 having two contents codes 1 and 4 of the data group DF-1 (2401) set therein is registered in the node A (2404).

Explanation will now be made as to the schematic table setting operation when it is desired to newly register contents code 8 in this system configuration, by referring to FIG. 14. At the transmission originator node A (2404), the contents code cc8 is registered in the filter table 2407 (step 2501). After the registration, the transmission originator node broadcasts into the system the contents code to be transmitted and registered (step 2507). The data to be broadcast is attached with the contents code indicative of the filter information registration. In the system of FIG. 13, the node C (2406) within the data group different from the transmission originator accepts the broadcast data. The node C (2406) searches the filter table for the contents codes cc to be filtered and judges on the received information whether or not there is the contents code to be filtered within its own data group, i.e., whether to be changed to the contents code unique to its own data group (step 2504). A contents code ccQ of the data group DF-2 is registered for the cc8 of the data group DF-1 (step 2505). The contents code ccQ f the data group DF-2 is registered for the contents code ccQ of: the data group DF-1 to be filtered within a filter table 2408 of its own node (step 2506). The node C (2406) sends a response to the transmission originator node A to ask it to add the corresponding information in the filter table (step 2508). The node A, on the basis of the returned response of the filtering data registration, sets filter information having the same correlation relation in the filter table 2407 (step 2503).

In this way, the setting of the filter table enables realization of a function of making the same data flow through a plurality of data groups within the system. This means that, when the contents codes corresponding to the contents code structures of the respective data groups are set for the respective data groups, the data state shared between the data groups can be realized. In the present embodiment, the filtering operation is defined as processing of causing the same data to flow through each of a plurality of data groups in the form of the contents code structure of its group, the contents code corresponding to the address system thereof or address. The execution of the filtering operation enables the same data to be shared between a plurality of the data groups, thus allowing flexible cooperative processing between the data groups. In an embodiment to be explained later, the definition of the filtering operation will be expanded.

Figure 15A:
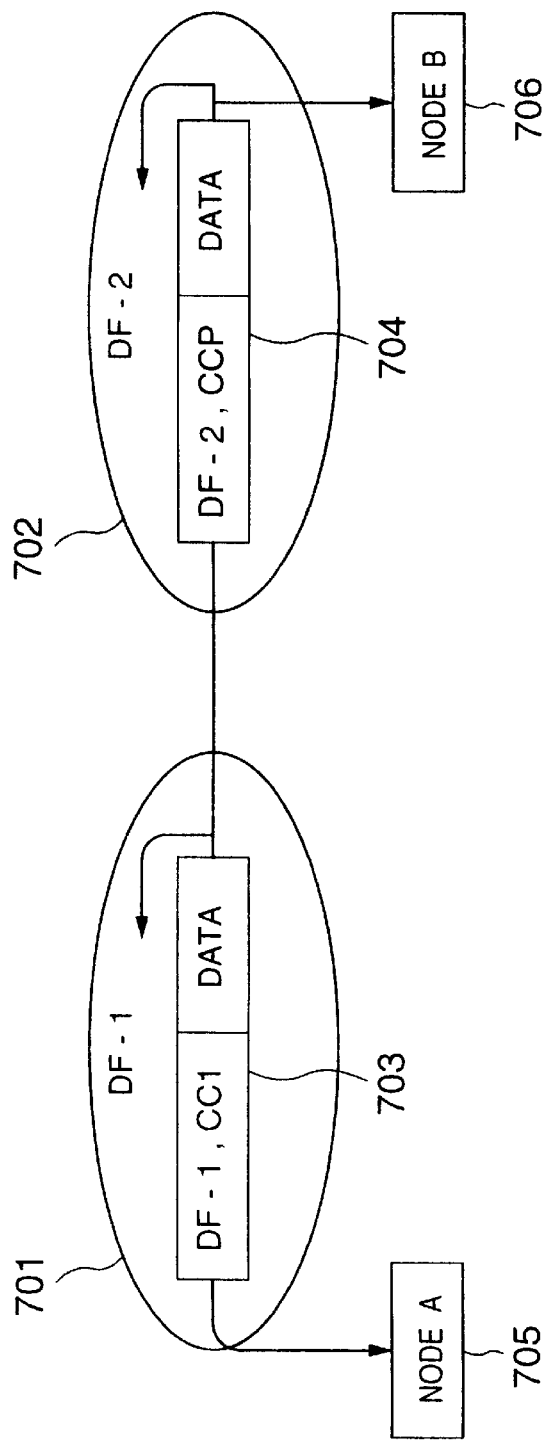
FIGS. 15A and 15B are diagrams for explaining data flows between data groups at the time of executing the filtering operation in the first embodiment.
Figure 15B:
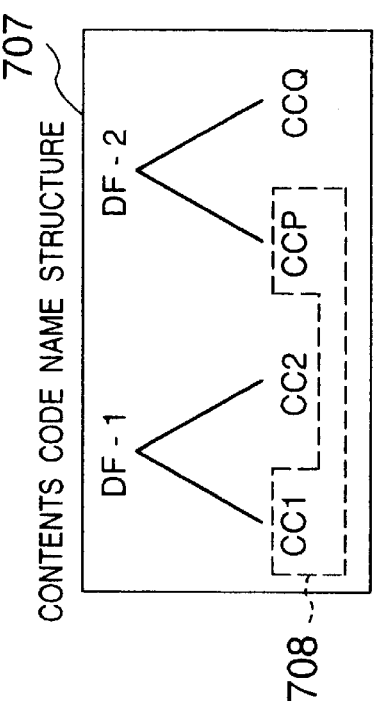

FIGS. 15A and 15B are diagrams for schematically explaining data flows between data groups at the time of executing the filtering operation in the first embodiment.

The illustrated system comprises two data groups DF-1 (701) and DF-2 (702) which in turn are connected with a node A (705) and a node B (706) respectively both with a transmission/reception access authority.

Explanation will first be made as to a case where data indicated by a contents code ccl belonging to the data group DF-1 (701) is shared with the data group DF-2 (702). When data 703 of a contents code (DF-1.ccl) was transmitted from the node A (705), the data flows in the data transmission range of the data group DF-1 (701). Each of the nodes within the system has such a filter table as shown in FIG. 4. Stored in the filter table are information on the contents codes for the respective data groups when the same data is shared between the plurality of data groups.

In order that the data is shared with the data group DF-2 (702), the data information is registered in the filter table possessed by the node A (705). When the corresponding data is transmitted from the node A (705), transmitting filter processor 408 acquires information indicative of the contents codes of other data groups about that data from the filter table and performs its transmitting operation of the data in the data transmission ranges of the data groups. This causes the data 703 of the contents code (DF-1.ccl) to be converted to data 704 of a contents code (DF-2.ccP) through the filtering operation and then passed through the data group DF-2 (702), as shown in FIG. 15A. Thus, the node B (706) having the reception access authority to the data group DF-2 (702) can receive and process the data. When the data is transmitted without being subjected to the filtering operation, the data cannot be transmitted to the other data groups from the data group DF-1 (701), which results in that the node B (706) cannot receive that data.

Since it is intended in FIG. 15A that the data 703 is shared between the plurality of data groups, the filtering operation causes conversion of only the value of the contents code between the data groups. In other words, as shown by the data 703 and 704 in FIG. 15A, with respect to the data shared between the plurality of data groups, its contents code alone is set as its value for each data group, so that the contents code (DF-1.ccl) is converted to the contents code (DF-2.ccP) but the contents of the data is caused to flow through the respective data groups as it is.

FIG. 15B shows a contents code name structure 707. In this connection, contents codes to be set in the system may be expressed each in terms of a name in a character string, a number or a symbol, that is, such a name as a user feels easy to handle it can be employed therefor. Like the contents code structure 508 shown in FIG. 11B, the contents code name structure 707 is different for each of the data groups. However, since there is data shared between the data groups in the contents code name structure 707 of FIG. 15B, the contents code name structure 707 is different from the contents code structure 508 of FIG. 11B. That is, reference numeral 708 indicates, when defined as the contents codes ccl and ccP of the data groups DF-1 and DF-2 indicative of the same data contents, that the same data is shared between the data groups DF-1 and DF-2.

Shown in FIG. 16 is a flowchart for explaining a data transmission procedure involved in the filtering operation in the first embodiment.

In FIG. 10, first of all, an instruction for transmission of data having a data group name, contents code and data contents set therein is transmitted from the terminal to the processor 412 via the interface 413 (step 801). The data transmitter 407 receives the data transmission instruction from the terminal (step 802) and on the basis of the data group name and contents code, inquires of the transmitting filter processor 408 about the filter information. The transmitting filter processor 408 refers to the filter table 1 to searches the table for a predetermined data group name and contents code conforming to the transmission instruction (step 803). When the conformed contents code etc. are present in the filter table (step 804), the transmitting filter processor 408 searches for and refers to the other data group names and contents codes thereof set in the filter table 1 (step 807). The transmitting filter processor 408 refers to the data group table 8 for each of the searched data groups and searches for the data transmission range information for its reference (step 808). This operation is required to be performed over all the data groups searched and acquired. When acquiring all the information of the filtering destination, the transmitting filter processor 408 passes the information to the data transmitter 407 to prepare therein messages corresponding to the respective data groups (step 809) and to transmit the messages (step 810).

Meanwhile, when the contents code for transmission request is not present in the filter table 1 (step 804), the transmitting filter processor 408 only information of the corresponding transmission data to the data transmitter 407. The data transmitter 407 searches the data group table 8 for the transmission range information conforming to the data group name of the transmission instruction (step 805), prepares a message on the basis of the data group name and contents code (step 806), and transmits the assembled message (step 810).

Figure 17:
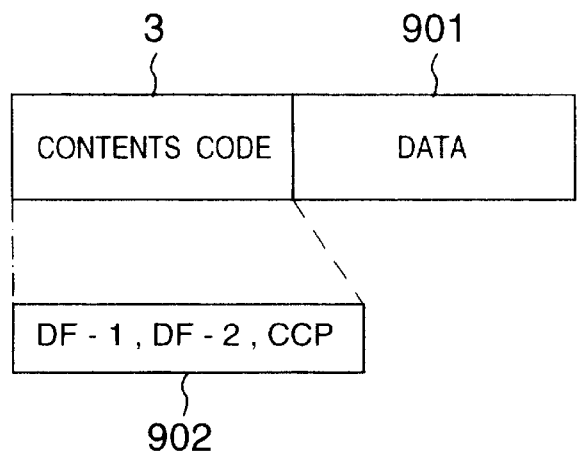
FIG. 17 shows a format of a data message in a second embodiment of the present invention.
Figure 18:
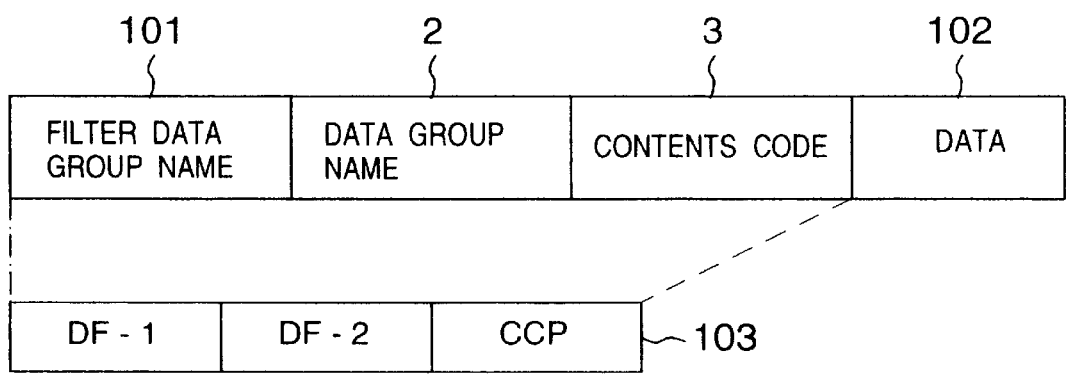
FIG. 18 shows a format of a data message in a modification of the second embodiment of the present invention.

FIG. 17 is a format of a data message in a second embodiment of the present invention, and FIG. 18 is a format of a data message in a modification of the second embodiment.

Prior to explanation of the second embodiment, explanation will be made as to the format of the filtered message. There are 3 ways (A), (B) and (C) of recognizing the filtered message, which follow.

(A) The first method is to attach only the filtered contents code information to a message and then transmit it. When the format of this method is employed, the message receiver cannot recognize which data group the data was transmitted from. For example, when the data group DF-1 transmits a message with the contents code ccl and transmits the message to the data group DF-2 as filtered with the contents code ccP, the receiver node of the data group DF-2 cannot recognize that the corresponding data is the data which was transmitted to the data group DF-2 as filtered by the data group DF-1. The user program 421 cannot recognize whether or not the data is the filtered data. That is, the node receives as the same content code not only the data received from a data group to which the node belongs but also the filtered data received from another data group to which the node does not belong. This ensures such a property that the data is independent of the intervention position of the data group, i.e., positional permeability. In this case, the management of the filtering operation is carried out only by the side of the user-program managing system. That is, since the contents of the user program will not be changed by a change in the filtering information, system expandability and program maintenance can be improved.

(B) The second method is to set a contents code name also including a data group name in the contents code 3. This method corresponds to FIG. 17 showing the second embodiment. When it is desired to filter a message on the contents code ccl of the data group DF-1, the data group name and contents code of the filtering destination are set as a contents code 902 of the transmission message (for example, DF-1.DF-2.ccP). In this case, the receiver-side user program 421 can recognize the data group name of the filtering originator by referring to the contents code 902 (can recognize the data group DF-1). The employment of this method enables the filtering operation to be recognized so that the receiver side can acquire the information of any transmission originator.

(C) The third method is to define the filtering originator data group name, transmission destination data group name and contents code as separate entries in a message format prior to transmission thereof. This method corresponds to FIG. 18 showing the modification of the second embodiment. In FIG. 18, a filter data group name (DF-1) 101, a data group name (DF-2) 2, a contents code (ccP) 3 and data 102 are built in the format as separate entries. When the format is divided in this way, only the data group name 2 and contents code 3 are passed to the user program 421 together with the data 102. The filter data group name 101 is used in the data receiver to judge whether to receive the associated data on the basis of that information.

FIG. 19 shows data flows between data groups at the time of executing the filtering operation in the second embodiment.

Explanation will be made as to a procedure of converting a contents code of a message filtered between data groups when the format of the message is defined as shown in FIGS. 17 and 18, by referring to FIG. 19.

Data 1106 transmitted from a node A (1103) is intended to be filtered so as to be passed from a data group DF-1 (1101) corresponding to a computer group to a data group DF-2 (1102) corresponding to a computer group. In this case, the corresponding data 1106 is transmitted as a contents code (DF-1.ccl) within the data group DF-1. Data filtered for the data group DF-2 is transmitted as a contents code (DF-1.DF-2.ccP) within the data group DF-2 (1102). A node B (1104) belonging to the data group DF-2 (1102) is assumed to request the reception of the data with the contents code ccp. In this case, the node B (1104) receives both data 1108 transmitted from a node C (1105) belonging to the data group DF-2 and filtering data 1107. In a receiving user program within the node B (1104), whether to recognize the filtering data depends on the message-format setting method.

In the second embodiment of FIG. 17, when the data 1106 flows through the data group DF-1, the data is stored as a contents code 3 of (DF-1.ccl) in a single entry; whereas, when the filtered data 1107 flows through the data group DF-2, the data is stored as the contents code 3 of (DF-1.DF-2.ccP) in a single entry.

In the modification of the second embodiment of FIG. 18, on the other hand, when the data 1106 flows through the data group DF-1, the data is stored as the data group name (DF-1) 2 and contents code (ccl) in separate entries. When the filtered data flows through the data group DF-2, the data is stored as the filter data group name (DF-1) 101, data group name (DF-2) 2 and contents code (ccP) 3 in separate entries.

Explanation will further be made as to the second embodiment.

The system configuration and within-node function arrangement of the second embodiment is based substantially on the first embodiment (see FIGS. 1 and 2). Explanation will b e directed mainly to the operation of receiving the filtering data in the second embodiment.

Shown in FIG. 20 is a data structure of a receiving data group table used in the s econd embodiment.

The data group table 8 in FIG. 10 forms the receiving data group table. Registered in the data group table are the reception request contents code registered in the received-data register 406 and the belonging data group name thereof. This table holds therein, in addition to these information, information for judgement of reception or non-reception of data to be possibly received through the filtering operation. That is, a receivable data group name is specified for each contents code. The "receivable data group name" refers, with respect to the associated contents code, to the data group of the filtering originator receivable when receiving the associated data flowing through the belonging data group through the filtering operation. In this case, the system has such a function as to receive only the filtering data of the specified data group and not to receive the filtering data from the other data groups. When such a receivable data group is not specified in this table, the system can receive all the filtering data. In the example of FIG. 20, a terminal (belonging to the data group DF-1) receiving the contents code cc1 can receive only the data of the data group DF-2 as the filtering originator; while a terminal (belonging to the data group DF-2) receiving the contents code ccQ can receive only the data of a data group DF-3 as the filtering originator. Further, a terminal receiving the contents codes cc2 and ccQ can receive all the filtering data. Since the method for specifying a data group as the filtering originator for reception is featured in that only information from a specific data group is subjected to the filtering operation, information flow between data groups can have its directivity. In other words, the flow of information to be filtered can be controlled not only by the data transmitter side but also by the data receiver side. In this connection, since this table be held in the system, it is unnecessary for the user program 421 to recognize it. That is, since the system side prescribes the information flow between data groups, it is only required for the user program side to recognize only the receiving content code. And even when the system changes the flow of the filtering data, this will not involve change of contents of the user program.

Figure 21:
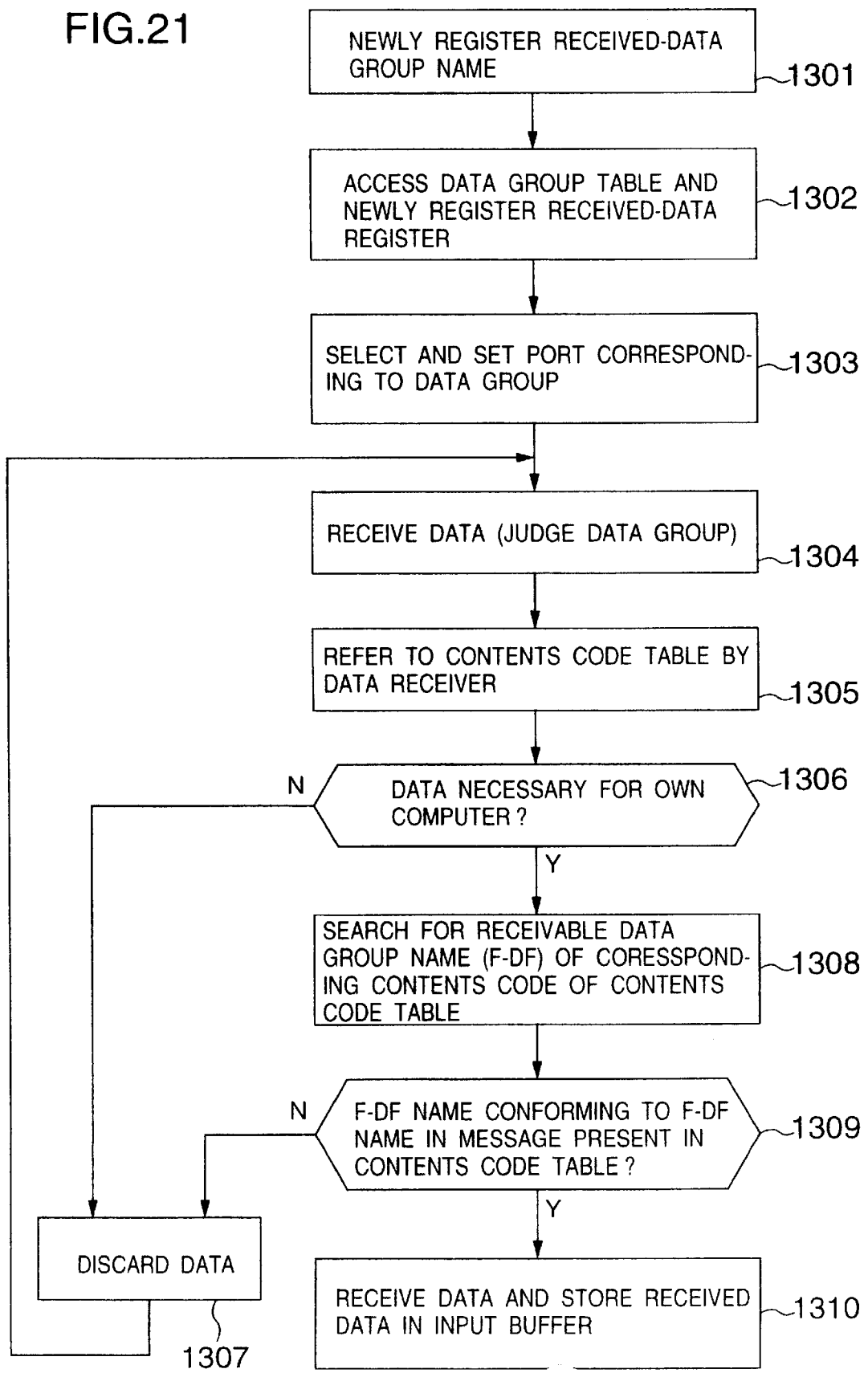
FIG. 21 is a flowchart for explaining the operation of a data receiving procedure in the second embodiment.

Referring to FIG. 21, there is shown a flowchart for explaining the receiving operation of the filtering data in the second embodiment.

In this case, although it is also possible for the system to receive even data not filtered, the system is featured, in particular, in the operation of receiving the filtering data and thus explanation will be made as to the processing flow by limiting thereto. The user program 421 passes the registration information of the receive data group name to the received-data register 406 (step 1301). The received-data register 406 registers the corresponding information in the data group table 8 (step 1302). The received-data register 406 selects and sets one of ports corresponding to the data group in the contents code selector 403 (step 1303). When receiving the filtering data, the data group selector 402 selects whether or not the data is necessary for its own node to receive it (step 1304). Then the contents code selector 403 refers to the contents code table 9 and on the basis of the contents code of the corresponding data, selects whether the data is necessary for its own node (step 1305). If the data is necessary for its own node (step 1306), then the contents code selector 403 passes the corresponding data to the receiving filter processor 404 to search the contents code table 9 for the receivable data group name (which will be referred to as F-DF, hereinafter) of the corresponding contents code (step 1308). When the F-DF conforming to the F-DF name in the message is present in the contents code table 9 (step 1309), the data receiver 405 receives the data and stores the received data in the input buffer 409 (step 1310). When the corresponding message has a contents code not requested by its own node (step 1306) or when the conformed F-DF name is present in the contents code (step 1309), the node discards the received message (step 1307) and moves its operation to the next-message receiving operation.

Explanation will then be made as to a third embodiment of the present invention. Even in the third embodiment, the system configuration and node arrangement of FIGS. 1, 2 and 10 are applied.

Explanation will be made herein as to transmit data with filtering priorities set for respective transmission content codes in the filtering operation of a data transmission mode. When it is desired to register filtering information, a reference contents code and a contents code of a data group as a filtering destination are specified. The present embodiment is valid when a transmission originator node can transmit data to a plurality of data groups. In this case, at the time of specifying the contents codes of the data groups, it is possible to previously specify whether to perform filtering operation toward the other data groups.

Figure 22:
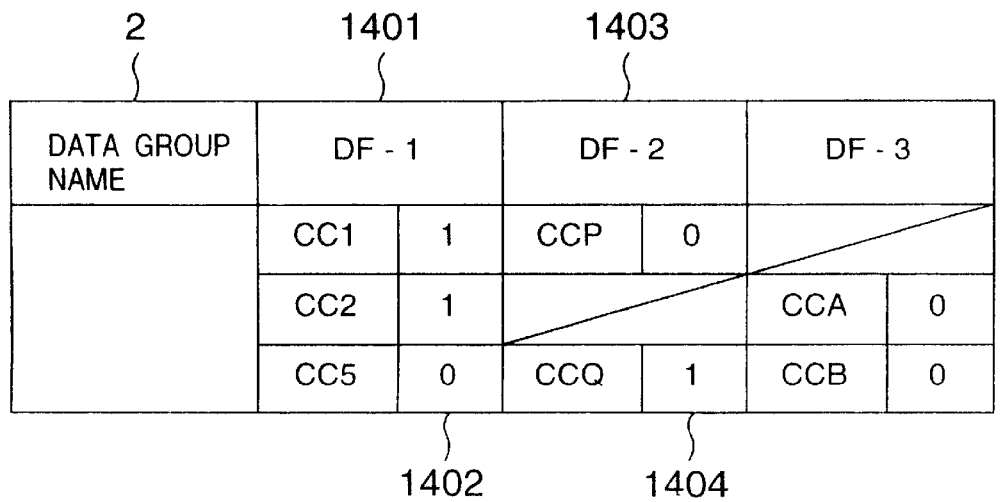
FIG. 22 shows contents of a filter table in a third embodiment of the present invention.

FIG. 22 shows a data structure of a filtering information table used in the third embodiment.

In the drawing, the abscissa of the filtering information table 2 denotes the filtering information of data to be filtered, while the ordinate thereof denotes the contents codes of data groups as filtering destinations for the respective data. It is assumed in this example that its own node has a data transmission authority to a plurality of data groups, so that, even when each data specifies the contents code of any one of the data groups, the node converts the contents code and then transmits the data to the other filtering destinations indicated in the table. For example, when the node specifies to transmit a contents code (DF-1.cc5) in FIG. 22, the node filters or converts the contents code to contents codes (DF-2.ccQ) and (DF-3.ccB). When the node specifies to transmit the contents code (DF-2.ccQ), the nodes specifies to transmit contents codes (DF-1.cc5) and (DF-3.ccB). Accordingly, any contents code specified in the filtering information table 2 means that filtering operation is made in any case. That is, in the present embodiment, there can be realized a method which is intended to have directivity in the flow of information between data groups.

In the present embodiment, the filtering information table 2 has transmission enable flags 1402 and 1404 for each contents code set therein. When the flag is in its "on" state, this means to transmit all the filtering contents codes registered for the corresponding message. When the flag is in its "off" state, this means to transmit only the data of the corresponding contents code and not to transmit the other filtering data. In the table of FIG. 22, when there was a transmission request for the contents code (DF-1.cc5), data transmission is not done to the data groups DF-2 and DF-3 because the flag 1404 is in the "off" state. When there was a transmission request for the contents code (DF-2.ccQ), data transmission is done even to the data groups DF-1 and DF-3 because the flag 1404 is in the "on" state.

With respect to information to be set in the filtering information table 2, the information may be defined independently of the respective nodes or may be set as unified between the nodes without any troubles.

Figure 23:
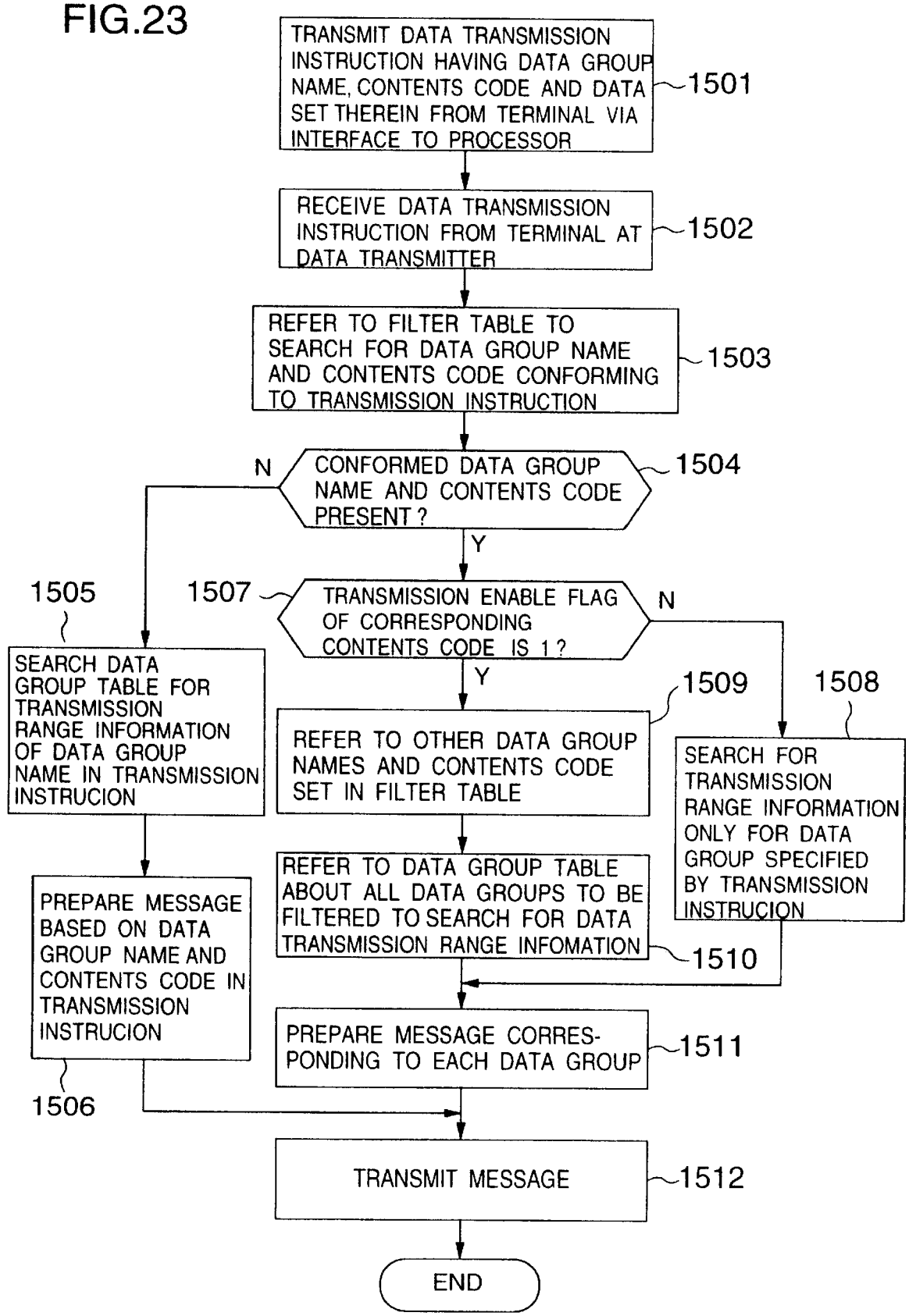
FIG. 23 is a flowchart for explaining the operation of a data transmitting procedure in a third embodiment.

Shown in FIG. 23 is a flowchart showing the transmitting operation in the third embodiment.

In FIG. 10, a data transmission instruction having a data group name, contents code and data set therein is transmitted from the terminal via the interface 413 to the data transmitter 407 (steps 1501 and 1502). The data transmitter 407 refers to the filtering information table 2 to search the table for the data group name and contents code conforming to the transmission instruction (step 1503). When there is a conformed contents code in the table (step 1504), the data transmitter 407 checks the transmission enable flag of the corresponding contents code (step 1507). If the flag is 1, then the data transmitter 407 refers to the other data group names and contents codes set in the filtering information table 2 (step 1509), acquires the transmission information (step 1510), prepares a message (step 1511), and then transmits the data (step 1512).

If the enable flag is 0 (step 1507), then the data transmitter 407 searches for and sets the transmission information only for the data group specified in the transmission instruction (step 1508), prepares a message (step 1511) and transmits the message (step 1512). When failing to find the conformed contents code in the filtering information table 2 (step 1504), the data transmitter 407 executes its usual transmitting operation (not filtering transmission) (steps 1505 and 1506), and transmits the message to complete its operation (step 1512).

Explanation will next be made as to a fourth embodiment of the present invention. In the fourth embodiment, there is employed such a data filing method that all nodes have no filtering table and only specific one of the nodes converts filtering information. For example, the gateway computer 7 in FIG. 3 is set as the specific node and the node alone can have such a function of converting filtering information as mentioned above.

Figure 24:
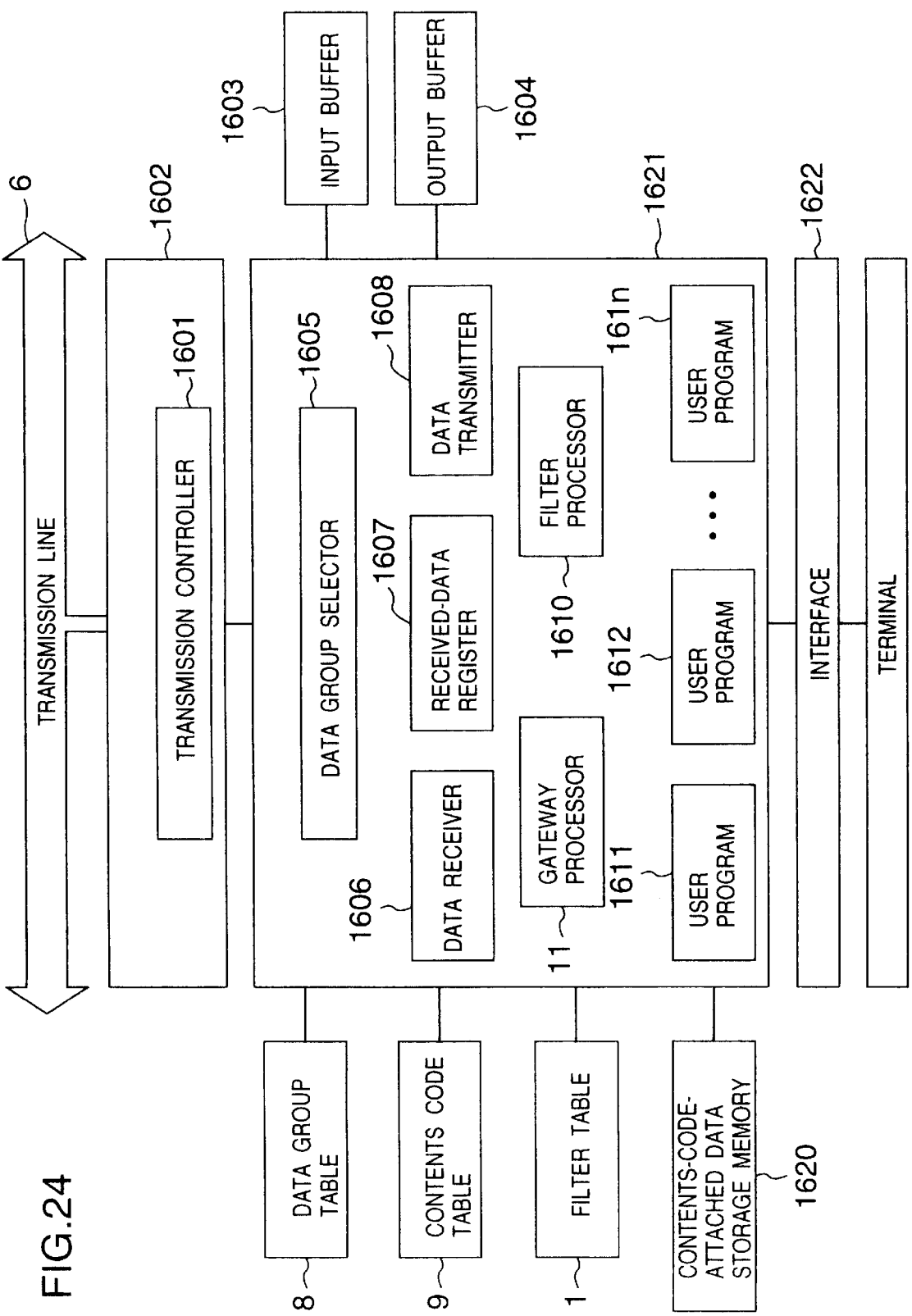
FIG. 24 is an arrangement of interior of a gateway computer in a fourth embodiment of the present invention.
Figure 25:
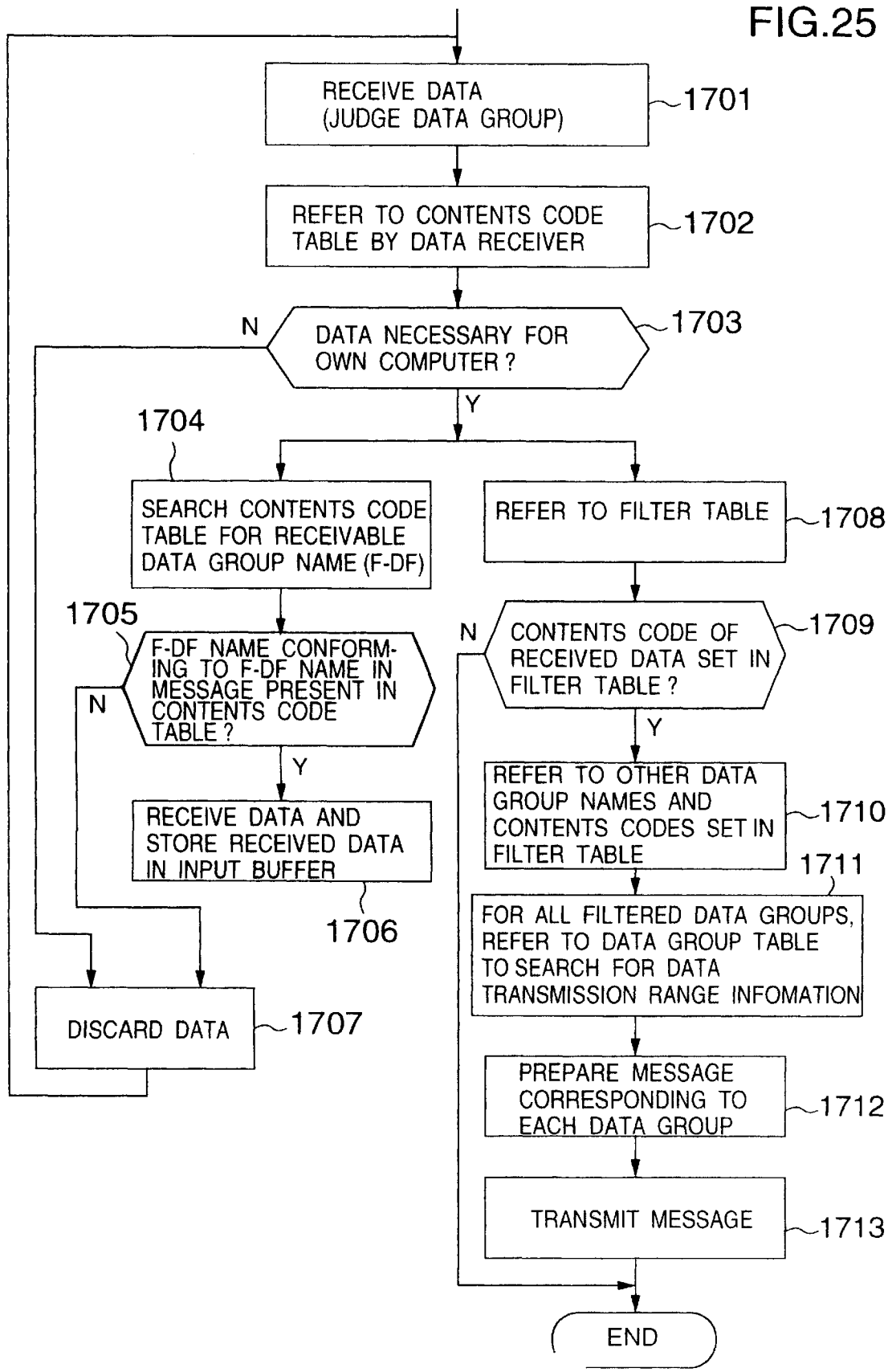
FIG. 25 is a flowchart for explaining the internal operation of the gateway computer in the fourth embodiment.
Figure 26:
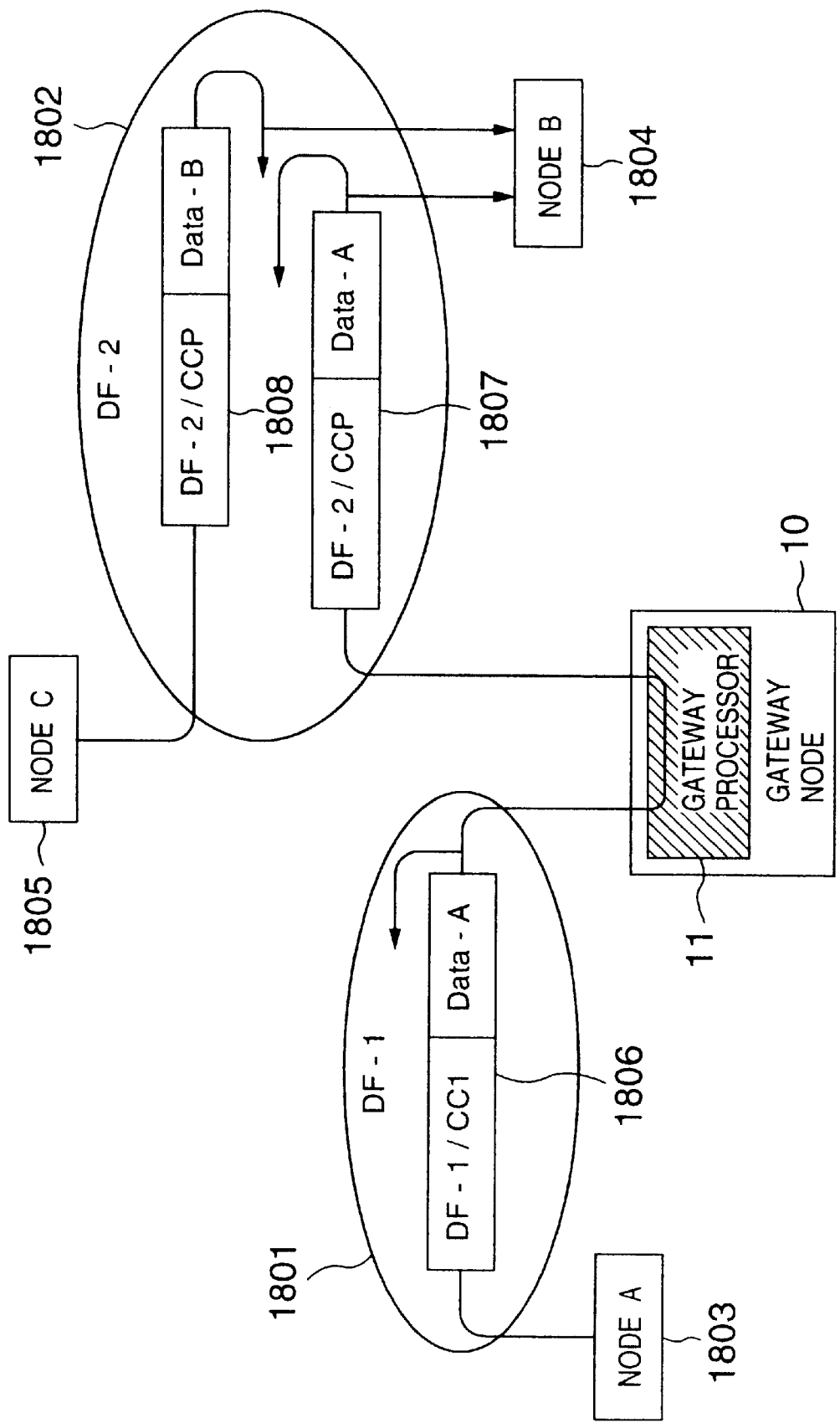
FIG. 26 is a diagram for explaining data flows between data groups through the gateway computer in the fourth embodiment.
Figure 27:
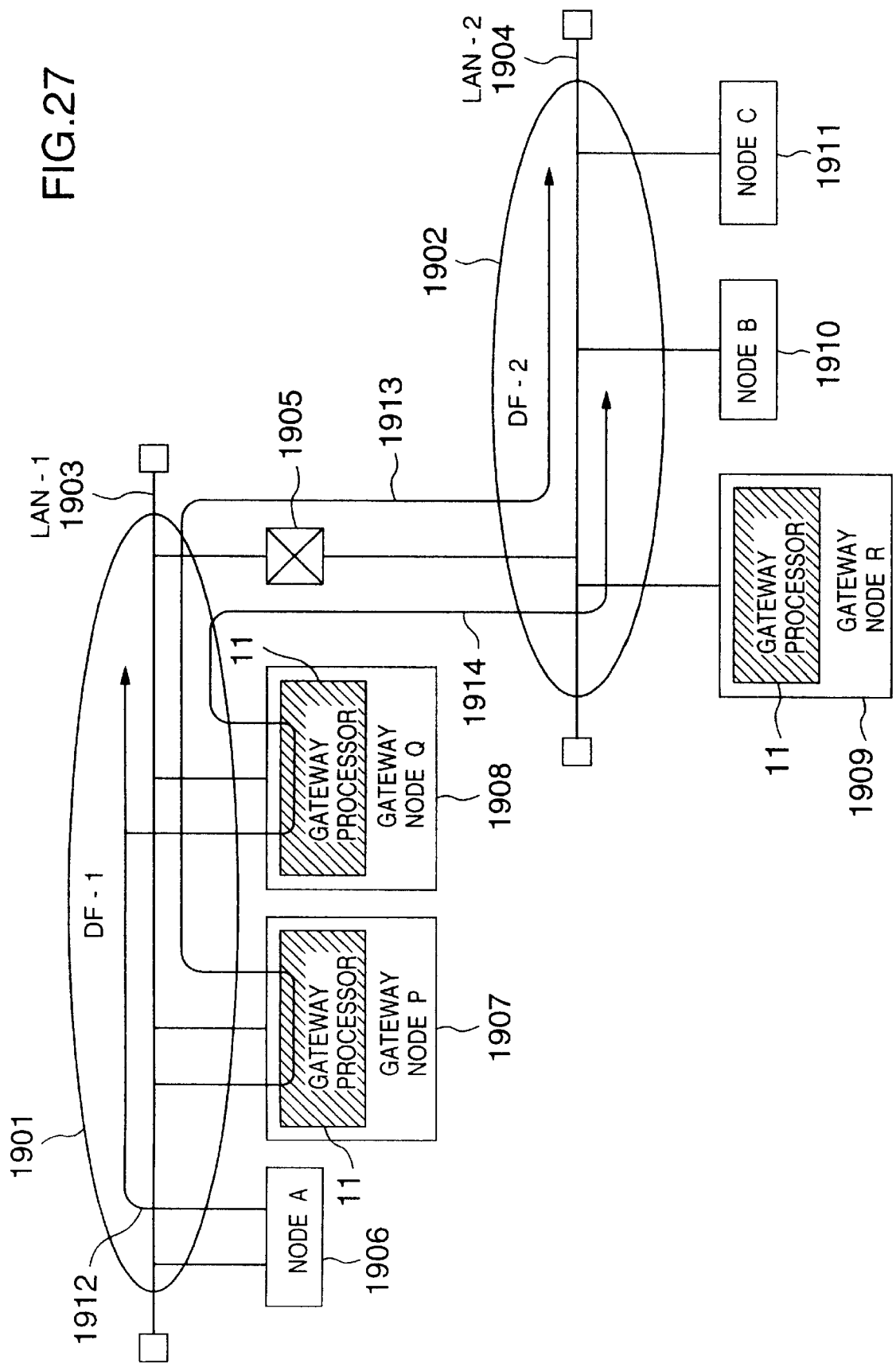
FIG. 27 schematically shows the data flows between the data groups of FIG. 26 replaced by physical structures.

FIG. 24 is an internal arrangement of the gateway computer in the fourth embodiment, FIG. 25 is a flowchart for explaining the processing contents of the gateway computer in the fourth embodiment, FIG. 26 shows data flows between data groups via the gateway computer in the fourth embodiment, and FIG. 27 corresponds to a replacement of the data flows of FIG. 6 by a physical arrangement.

As shown in FIG. 24, the internal structure of a gateway node 10 is substantially the same as that shown in the first embodiment (see FIG. 10) but different therefrom in that a gateway processor 11 is newly added and the transmitting filter processor is replaced by a filter processor 1610.

It is assumed in FIG. 26 that data groups DF-1 (1801) and DF-2 (1802) are interconnected by the gateway node 10. When data (DF-1/ccl.Data-A1806) is transmitted from a node A (1803) belonging to the data group DF-1 (1801) and the data is already filtered or converted to be passed through the data group DF-2, the information is already registered in the gateway processor 11 of the gateway node 10. After converted to a contents code at the gateway processor 11, the corresponding data flows through the data group DF-2 as filtering data (DF-2/ccP.Data-A1807) to be received at a node B (1804) waiting for receiving it with the corresponding contents code.

It is unnecessary for the gateway node 10 to be physically connected to the both networks.

FIG. 27 is intended for a system in which a network LAN-1 (1903) having a data group DF-1 (1901) and a network LAN-2 (1904) having a data group DF-2 (1902) are interconnected by a router 1905. In this system, gateway nodes P (1907), Q (1908) and R (1909) are set each of which has the gateway processor 11 to realize the system configuration. Data filtered between the data groups are passed to the party data group through all the gateway nodes P, Q and R. When such a function is implemented, the gateways can be configured in a multiplexed manner and the gateway function can be improved in the reliability and after-fault performance. More in detail, the data transmitted from the node A (1906) is subjected to the filtering operation at two of the gateway nodes P (1907) and Q (1908) of the data group DF-1 (1901) to get two pieces of data, and these data are transmitted to the data group DF-2 through the router 1905, so that, even when one of these data becomes lost for some reason, the remaining data can be sent to the party terminal, thus enhancing its reliability.

FIG. 25 is a flowchart for explaining the data receiving and relaying operations of the gateway nodes in the fourth embodiment. It is assumed in the flow-chart that contents codes for reception request are already registered.

First of all, when a node receives data from the data group to which its own node belongs (step 1701), the data receiver 1606 of the node refers to the contents code table 9 to check the presence or absence of a conformed contents code (step 1702). When a conformed contents code is not present (step 1703), the node discards the received data (step 1707) to perform its receiving operation over the next data. When the necessary data is present (step 1703), the node pass the same data both to the data receiver 1606 for its receiving operation (step 1704 and subsequent steps) and to the gateway processor 11 for its relaying operation (step 1708 and subsequent steps) for their concurrent operation.

With respect to the receiving operation, first, the node searches the contents code table for a receivable data group name (F-DF) (step 1704) and if finding an F-DF coincidence (step 1705), then the node receives the corresponding message and stores in its input buffer (step 1706). When failing to find an F-DF coincidence (step 1705), the node discards the corresponding data (step 1707) to continue its receiving operation for the next data.

With respect to the relaying operation, on the other hand, the node refers to the filter table 1 (step 1708) to search for the contents code of the received data set in the filter table (step 1709). If the contents code of the received data is set, then the node refers to the other data group names and contents codes set in the filter table (step 1710) to acquire the data transmission information (step 1711), and transmits the data (steps 1712 and 1713). If the contents code is not set in the filter table (step 1709), then the node performs no data relaying operation and terminates its operation as it is.

Figures 28, 29:
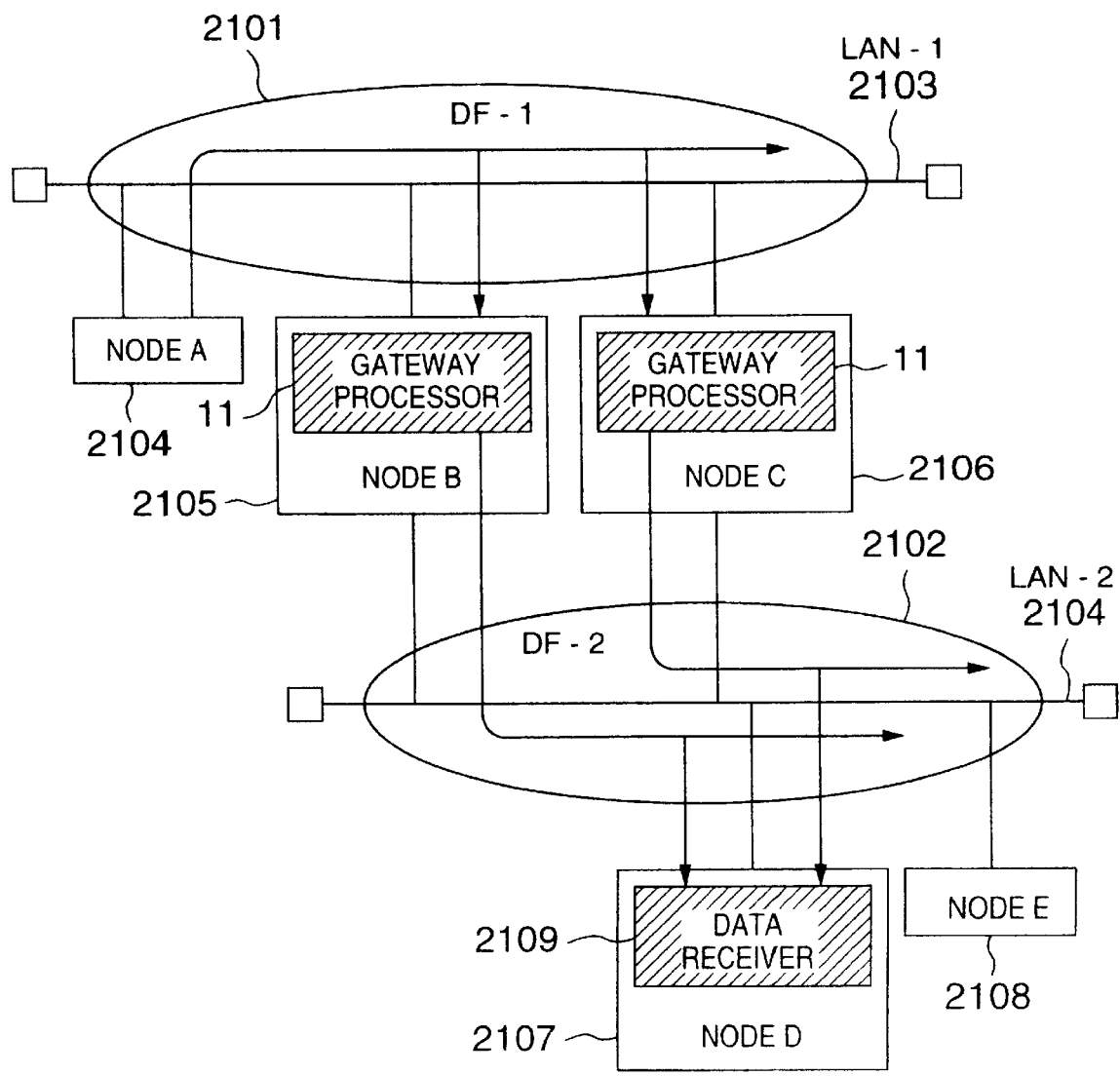
FIG. 28 shows a format of a data message in the fourth embodiment.
FIG. 29 is a diagram for explaining data flows of a system having gateway computers connected in a multiplexed manner.

FIG. 28 is a format of a data message used in the fourth embodiment. In this connection, there is a possibility that information flows through a data group as the filtering destination as mixed with filtering data from a plurality of gateways. More specifically, when the same data group DF-1 (1901) has two gateways P and Q as shown in FIG. 27, the data transmitted from the node A (1906) is relayed via the two gateway nodes, so that the data to be originally single is divided into two and the two data streams flows through the party data group DF-2 (1902). For this reason, information for management of data overlapped by times corresponding to the number of gateways is required to be provided in the message format.

In FIG. 28, a gateway serial number 2001 in the transmission message is used to uniquely identify the gateway within the system. This serial number is set in the message transmission originator. The serial number must be uniquely adjusted, with use of time stamp, node number, random number or the like, so that the number is not overlapped among the transmission nodes.

A gateway number 2002 is used when the receiving node as the filtering destination performs its reception counting operation over the same data over-lapped by times corresponding to the number of gateways. Details of use of such number will be explained in connection with FIGS. 30 and 31.

A gateway total number 2003 denotes a total number of gateways for relaying the same data. In the case of FIG. 27, the gateway total number is 2 corresponding to the number of the gateways P and Q.

A contents code 3, as in the first embodiment, is defined as a format including the data group and contents code of transmission data. Finally attached to the contents code 3 is actual data contents 2004.

Figure 30:
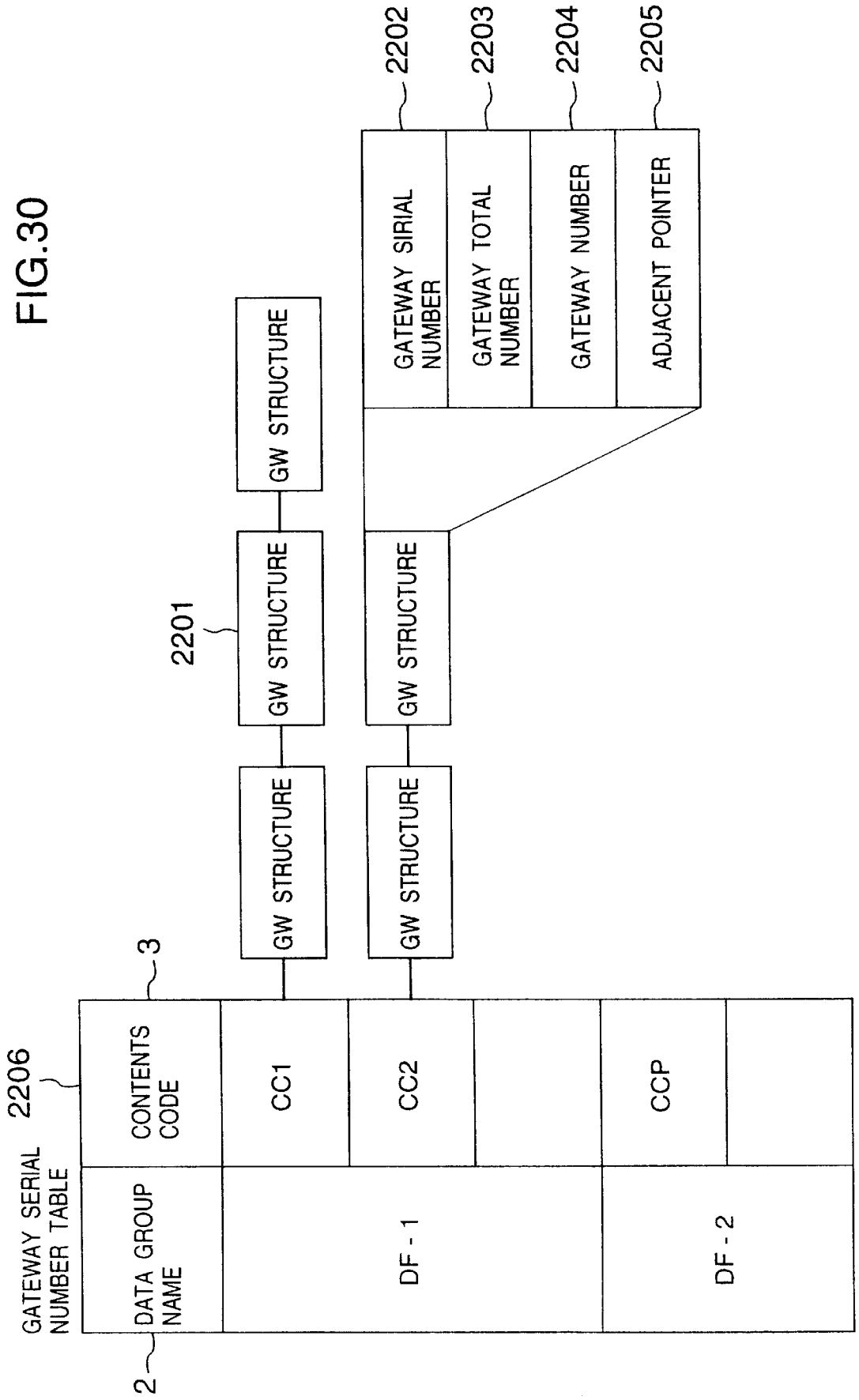
FIG. 30 shows contents of a gateway serial number table in the fourth embodiment.

FIG. 29 shows data flows of a system having gateway computers connected in the fourth embodiment in a multiplexed manner; and FIG. 30 shows an internal structure of a gateway serial number table in the fourth embodiment.

Among nodes A (2104), B (2105) and C (2106) belonging to a data group DF-1 (2101) and nodes D (2107) and E (2108) belonging to a data group DF-2 (2102), the nodes B, C and D are each provided therein with a gateway processor 11. In other words, these nodes B, C and D act each as a gateway node.

When a plurality of gateway nodes for relaying filtering data are present as shown in FIG. 29, the node D (2107) for receiving the same data will receive it as overlapped. Therefore, the data receiver 2109 of the node D must be provided therein with such a mechanism as to avoid the overlapped received data. An example of such a mechanism is shown in FIG. 30.

FIG. 30 shows a gateway serial number table 2206. Each data receiver has such a gateway serial number table 2206. In the illustrated example, a table entry is set for each contents code 3 of reception request. A gateway (GW) structure 2201 is defined for each message. The gateway structures thus defined are connected in the form of a list. Each gateway structure is made up, as shown in an enlarged view in FIG. 30, of a gateway serial number 2202, a gateway total number 2203, a gateway number 2204 and an adjacent pointer 2205. The gateway structure 2201 is usually connected to a free list (not used state) in the form of a list so that, in the data reception mode, the gateway structure is connected to the entry of the corresponding contents code in the form of a list. This structure can be used to prevent the overlapped reception of the same data with an overlap corresponding to the number of gateways.

Figure 31:
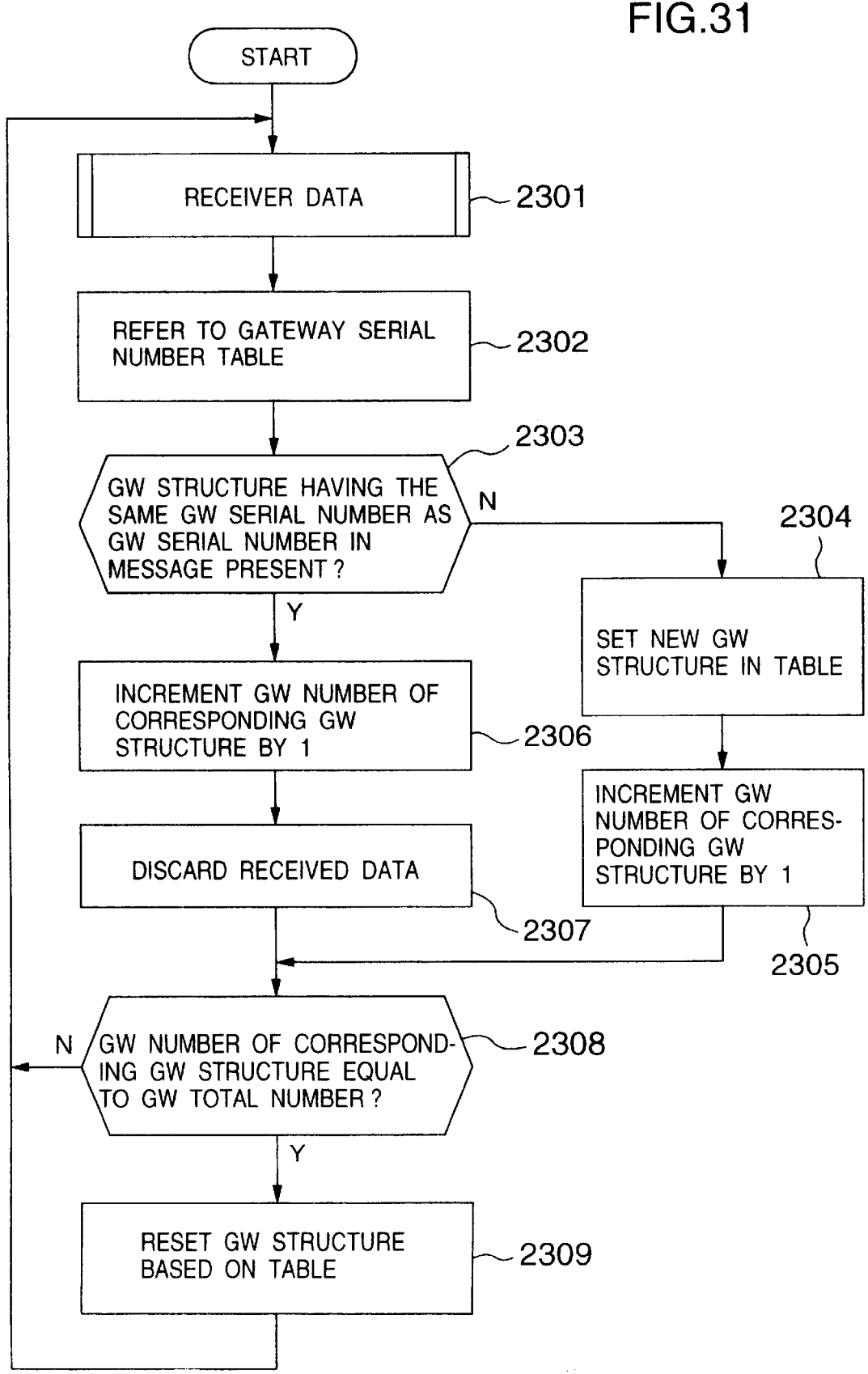
FIG. 31 is a flowchart for explaining the data processing procedure of each of the computers in the system having the gateway computers connected in a multiplexed manner.

FIG. 31 is a flowchart for explaining the data receiving operation in FIG. 30.

When receiving data (step 2301), the gateway node refers to the gateway serial number table 2302 (step 2302). When a gateway structure having a gateway serial number conforming to the gateway serial number of the message is already list-connected to the corresponding contents code entry (step 2303), the node judges that the corresponding data is already received. Accordingly, 1 is added to the gateway number 2204 of the corresponding gateway structure (step 2306) to discard the received data (step 2307). In the absence of the conformed gateway structure (STEP 2303), the gateway node judges that the corresponding data is not received as overlapped yet, secures a gateway structure for the corresponding data from the free list, and connects the gateway structure to the contents code entry (step 2304). And the node adds only 1 to the gateway number 2204 of the corresponding gateway structure (step 2305). The node then checks whether or not the gateway number of the corresponding gateway structure is equal to the gateway total number (step 2308). In this connection, the gateway total number is assumed herein to be recognized by the transmission originator and to be input in the message. As mentioned above, the gateway total number is the total number of gateway nodes in the data group of the transmission originator and overlapped data is regarded as identical to the gateway node total number, so that, if the both are identical, then the node judges as the overlapped data from all the gateways having completely received. Thus, the node resets the gateway structure from the table to connect it to the free list (step 2309). When the gateway number fails to reach the gateway total number (step 2308), the node shifts to the next receiving operation while keeping the gateway structure as it is. When this method is employed, the filtering operation can be reliably realized even in a multiplexed-gateway structure.

We claim:

1. A method for transmitting and receiving data in a system which includes a plurality of data groups and a plurality of computers each having a processor for performing its processing operation based on a user program and a transmission controller for transmitting data onto a plurality of transmission lines in response to a transmission request received from the user program and also receiving data from the transmission lines, wherein said computers are connected by two transmission lines, data having at least one or more different attributes is transmitted with a transmission range limited for each of said attributes, said method comprising the steps of:

when it is desired to transmit data having a plurality of attributes from a first computer to a first transmission line, providing in transmission data on the transmission line an area for specifying information about determining the transmission range of data corresponding to the attributes of the transmission data and an area for specifying condition information about judging reception or non-reception for a data receiver computer;

by the user program of the first computer, specifying said reception/non-reception condition information, information indicative of a data group set by the attributes of the data, and contents of the data in said first computer;

in said first computer, on the basis of preset correlation information between acquiring the data attributes and the transmission range information, acquiring the transmission range information of the data, attaching to the transmission data both of the data transmission range information and the condition information about judging the data reception or non-reception by said user program, and transmitting the data onto said first transmission line;

in a second computer connected between said first and second transmission lines in the system, making correspondence between the judging condition information of the data reception or non-reception at the receiver computer, information on the data group corresponding to the other attributes of the data, and judging condition information of the data reception or non-reception at the receiver computer in the data group;

in said second computer, when the transmission data flows through said first or second transmission line, acquiring information about judging reception or non-reception at receiver computers for the respective data groups on the basis of the transmission range information attached to said transmission data and filter information, attaching thereto both of the data transmission range information and the condition information of reception or non-reception at the receiver computer for each of the data groups, and relaying transmitting the transmission data in the transmission range specified in the transmission data among said first and second transmission lines;

in a third computer, performing information filtering operation by receiving the transmission data only when the transmission data is within the transmission range and only when the reception/non-reception judging condition at the receiver computer specified by the transmission data conforms to the condition indicated by the information, without paying any attention to the fact that the transmission data has a plurality of attributes;

in said second computer in the transmission lines for the respective data groups, making correspondence between condition information about judging reception or non-reception at a specified receiver computer, information about the data group corresponding to the other attributes of the transmission data, and condition information about judging reception or non-reception at the receiver computer in the data group;

in said second computer, a step of receiving the information flowing through the data group, acquiring the reception/non-reception judging condition information at the receiver computer for each data group on the basis of the transmission range information and said filter information attached to the transmission data, attaching thereto both of the data transmission range information for each data group and the reception/non-reception judging condition information at the receiver computer, and transmitting the transmission data in the transmission range specified in the transmission data; and in said second computer connected between the first and second transmission lines in the system, when the transmission data flows through said first or second transmission line, relaying transmitting the transmission data in the transmission range specified in the transmission data on the basis of the transmission range information attached to the transmission data.

2. A method as set forth in claim 1, further comprising a step of, in said second computer, attaching information for causing suppression of transmission of the same data to the other data groups to transmission data to be transmitted for each data group to provide directivity to a flow of the transmission data between the data groups.

3. A method as set forth in claim 1, further comprising a step of, in said third computer, previously setting information for enabling reception of the transmission data having a plurality of attributes from the other data group not present in the transmission range, and receiving the transmission data only when the transmission data conforms to the receivable information or is in the transmission range as the data group to which the transmission data belongs and only when the condition indicated by the information conforms to the reception/non-reception judging condition at the receiver computer specified in the transmission data.

4. A method as set forth in claim 1, further comprising a step of, when a plurality of gateway computers connected between said first and second transmission lines and having said filter information are present, previously providing in said third computer other than said first and second computers a table in which gateway serial numbers for the gateway computers, gateway numbers thereof and gateway total numbers thereof are stored and, at the time of receiving data, previously registering the gateway serial number and gateway total number of the gateway computer in attribute table entries and, at the time of receiving the same data as overlapped, adding the gateway number by 1, and when the gateway number becomes equal to the gateway total number, completing reception of the overlap data.

* * * * *